(12) United States Patent
Matsumura et al.

(10) Patent No.: US 12,101,178 B2
(45) Date of Patent: Sep. 24, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Runxin Wang, Beijing (CN); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 386 days.

(21) Appl. No.: 17/422,053

(22) PCT Filed: Jan. 11, 2019

(86) PCT No.: PCT/JP2019/000795
§ 371 (c)(1),
(2) Date: Jul. 9, 2021

(87) PCT Pub. No.: WO2020/144871
PCT Pub. Date: Jul. 16, 2020

(65) Prior Publication Data
US 2022/0103288 A1    Mar. 31, 2022

(51) Int. Cl.
*H04L 1/00*    (2006.01)
*H04L 5/00*    (2006.01)
*H04W 72/1263*    (2023.01)
*H04W 72/23*    (2023.01)

(52) U.S. Cl.
CPC .......... *H04L 1/0025* (2013.01); *H04L 5/0044* (2013.01); *H04W 72/1263* (2013.01); *H04W 72/23* (2023.01)

(58) Field of Classification Search
CPC .......................... H04W 72/23; H04L 25/0204
USPC ......................................................... 370/329
See application file for complete search history.

(56) References Cited

U.S. PATENT DOCUMENTS

| 2020/0383091 | A1* | 12/2020 | Park | ...................... H04W 72/23 |
| 2021/0250981 | A1* | 8/2021 | Takeda | .............. H04W 72/1273 |
| 2021/0337548 | A1* | 10/2021 | Gao | .................. H04W 72/0453 |

OTHER PUBLICATIONS

International Search Report issued in PCT/JP2019/000795 on Apr. 2, 2019 (1 page).
Written Opinion of the International Searching Authority issued in PCT/JP2019/000795 on Apr. 2, 2019 (4 pages).
ZTE, Sanechips; "Multi-TRP Transmission/Reception for DL and UL"; 3GPP TSG RAN WG1 Meeting NR#3, R1-1715435; Nagoya, Japan; Sep. 18-21, 2017 (7 pages).
Catt; "pdcch search space design"; 3GPP TSG RAN WG1 Meeting AH_#NR3, R1-1715813; Nagoya, Japan; Sep. 18-21, 2017 (11 pages).

(Continued)

*Primary Examiner* — Kiet M Doan
(74) *Attorney, Agent, or Firm* — Osha Bergman Watanabe & Burton LLP

(57) ABSTRACT

A user terminal includes: a control section to which one mode of a plurality of modes associated with different operations of one or more transmission points is configured; and a receiving section that receives one or more downlink shared channels from the one or more transmission points according to the mode. According to one aspect of the present disclosure, it is possible to appropriately operate in response to operations of one or more transmission points.

6 Claims, 7 Drawing Sheets

(56) References Cited

OTHER PUBLICATIONS

Huawei, HiSilicon; "Further details on beam indication"; 3GPP TSG RAN WG1 Meeting #91, R1-1719806; Reno, USA; Nov. 27-Dec. 1, 2017 (12 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in European Application No. 19908276.9 mailed on Jul. 22, 2022 (8 pages).
InterDigital Inc., "DCI Design for Multi-TRP/Panel Transmission for DL", 3GPP TSG RAN WG1 Meeting NRAH2, R1-1710923, Qingdao, China, Jun. 27-30, 2017 (3 pages).
Samsung, "Discussion on DL/UL multi-TRP/-panel supports", 3GPP TSG RAN WG1 Meeting 90bis, R1-1717598, Prague, CZ, Oct. 9-13, 2017 (8 pages).
Office Action issued in Indian Application No. 202117031038, dated Jan. 17, 2023 (6 pages).

\* cited by examiner

USER TERMINAL AND RADIO COMMUNICATION METHOD

TECHNICAL FIELD

The present disclosure relates to a user terminal and a radio communication method of a next-generation mobile communication system.

BACKGROUND ART

In Universal Mobile Telecommunications System (UMTS) networks, for the purpose of higher data rates and lower latency, Long Term Evolution (LTE) has been specified (Non-Patent Literature 1). Furthermore, for the purpose of a larger capacity and higher sophistication than those of LTE (Third Generation Partnership Project (3GPP) Releases (Rel.) 8 and 9), LTE-Advanced (3GPP Rel. 10 to 14) has been specified.

LTE successor systems (also referred to as, for example, the 5th generation mobile communication system (5G), 5G+ (plus), New Radio (NR) or 3GPP Rel. 15 or subsequent releases) are also studied.

In legacy LTE systems (e.g., LTE Rel. 8 to 14), a user terminal (User Equipment (UE)) controls reception of a downlink shared channel (e.g., Physical Downlink Shared Channel (PDSCH)) based on Downlink Control Information (also referred to as, for example, DCI or a DL assignment) conveyed via a downlink control channel (e.g., Physical Downlink Control Channel (PDCCH)). Furthermore, the user terminal controls transmission of an uplink shared channel (e.g., Physical Uplink Shared Channel (PUSCH)) based on DCI (also referred to as, for example, a UL grant).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)", April 2010

SUMMARY OF INVENTION

Technical Problem

It is studied for a future radio communication system (e.g., NR) to perform transmission that uses a plurality of transmission points (such as transmission/reception points or panels). It is supposed that configurations of, for example, beams differ according to operations of one or a plurality of transmission points.

However, how one or a plurality of transmission points operate and how these operations are configured to a UE are not clear. Unless these operations are appropriately configured to the UE, there is a risk that communication quality deteriorates.

It is therefore one of objects of the present disclosure to provide a user terminal and a radio communication method that appropriately operate in response to operations of one or more transmission points.

Solution to Problem

A user terminal according to one aspect of the present disclosure includes: a control section to which one mode of a plurality of modes associated with different operations of one or more transmission points is configured; and a receiving section that receives one or more downlink shared channels from the one or more transmission points according to the mode.

Advantageous Effects of Invention

According to one aspect of the present disclosure, it is possible to appropriately operate in response to operations of one or more transmission points.

DESCRIPTION OF EMBODIMENTS (Multi-TRP Transmission)

It is studied for future radio communication systems (e.g., Rel. 16 and subsequent releases) to perform non-coherent DL (e.g., PDSCH) transmission respectively from a plurality of transmission points. Transmitting non-coherent DL signals (or DL channels) from a plurality of transmission points in a coordinated manner may be referred to as Non-Coherent Joint Transmission (NCJT).

Furthermore, in the present disclosure, the transmission point may be read as a Transmission/Reception Point (TRP), a panel (an antenna panel or a plurality of antenna elements), an antenna, an antenna port or a cell. The transmission point (such as a TRP or a panel) can be replaced with, for example, a beam, a spatial filter, a Reference Signal (RS) resource, Quasi Co-Location (QCL), a Transmission Configuration Indication (TCI) or a concept obtained by grouping these.

It is also assumed to control scheduling of non-coherent PDSCHs transmitted respectively from a plurality of transmission points by using one or more pieces of Downlink Control Information (DCI). In one example, at least one of pluralities of downlink control channels (e.g., PDCCHs) and pieces of DCI are used to schedule the PDSCHs transmitted from a plurality of transmission points.

In this case, it is also conceived to allocate PDSCHs transmitted respectively from different transmission points to the same resource (e.g., time and frequency resources) to transmit. For example, a configuration where PDSCHs associated with the same Codeword (CW) are transmitted by different layers (see FIG. 1A), and a configuration where PDSCHs associated with different CWs are transmitted (see FIG. 1B) are supported.

Figure 1A:
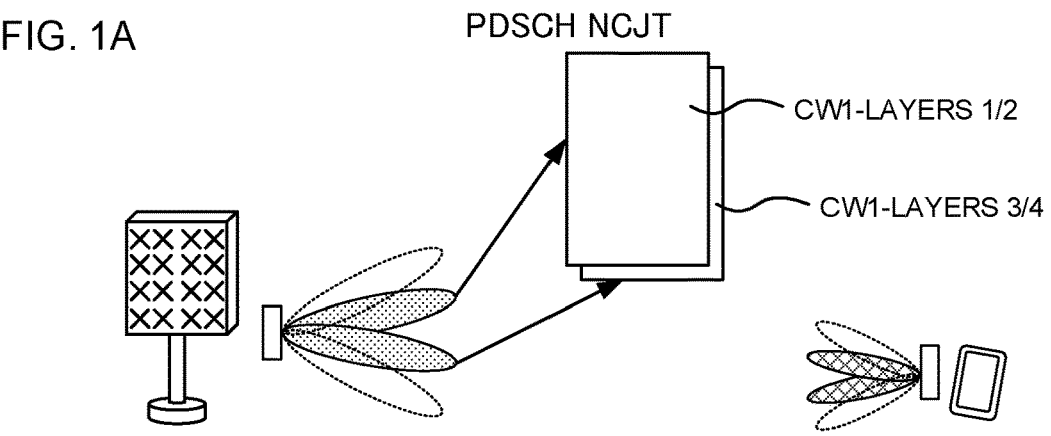
FIGS. 1A to 1C are diagrams illustrating one example of multi-TRP transmission.

FIG. 1A illustrates a case where a PDSCH (associated with a CW #1) transmitted from a first transmission point is allocated to the same time and frequency resources by using at least one of layers 1 and 2, and a PDSCH (associated with the CW #1) transmitted from a second transmission point is allocated to the same time and frequency resources by using at least one of layers 3 and 4.

Figure 1B:
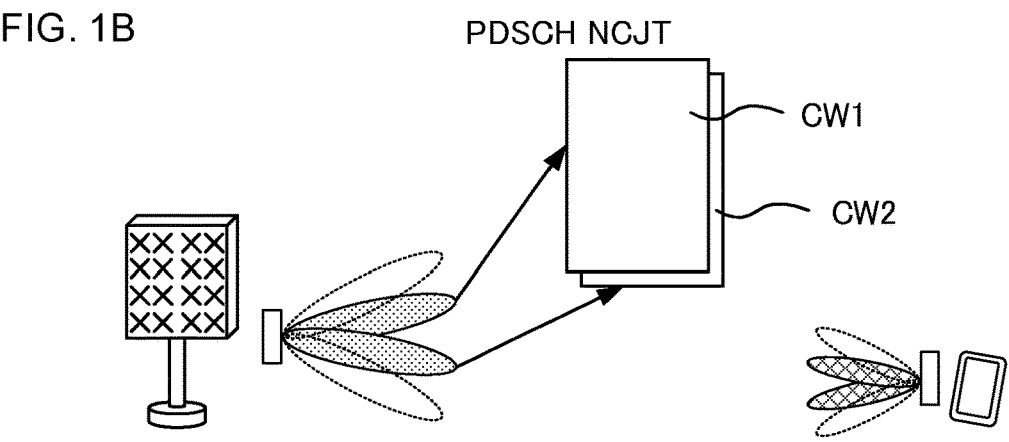

FIG. 1B illustrates a case where the PDSCH (associated with the CW #1) transmitted from the first transmission point and a PDSCH (associated with a CW #2) transmitted from the second transmission point are allocated to the same time and frequency resources.

Figure 1C:
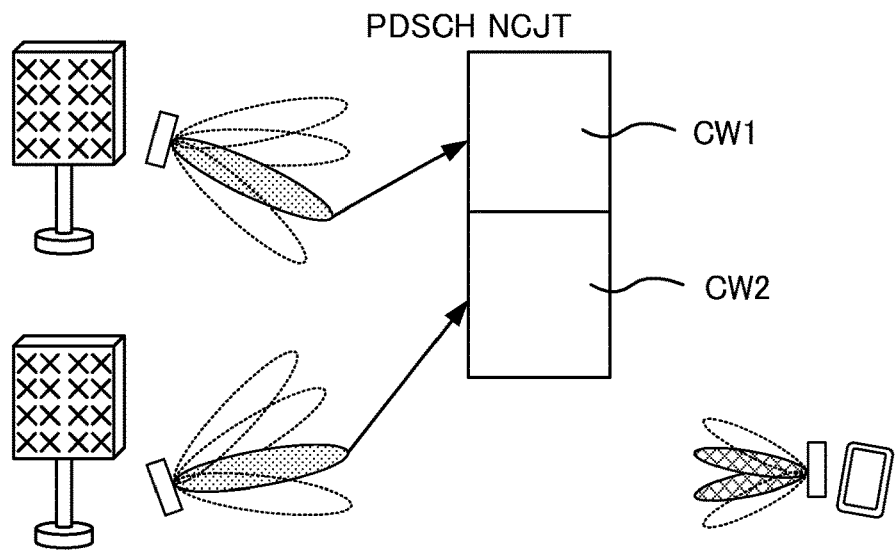

Furthermore, as illustrated in FIG. 1C, during multi-TRP transmission, a plurality of PDSCHs may be transmitted in different Multiple Input Multiple Output (MIMO) layers. Furthermore, time resources and frequency resources of a plurality of PDSCHs may overlap.

A UE may be configured by a higher layer signaling (configuration information) to perform communication (e.g., multi-TRP transmission) that uses a plurality of TRPs. The UE may be notified of information (at least one of the higher layer signaling and the DCI) that indicates allocation of a plurality of resources respectively associated with a plurality of TRPs to perform communication that uses a plurality of TRPs.

A plurality of TRPs may belong to a synchronous network, or may belong to an asynchronous network. Furthermore, a plurality of TRPs may be connected via an ideal backhaul, or may be connected via a non-ideal backhaul. (TCI State)

It is studied for NR to control reception processing (e.g., at least one of reception, demapping, demodulation and decoding) of at least one of a signal and a channel (that are expressed as a signal/channel) based on a TCI state.

In this regard, the TCI state is information related to Quasi-Co-Location (QCL) of a signal or a channel, and may be referred to as a spatial reception parameter or spatial relation information (spatial relation info). The TCI may be configured to the UE per channel or per signal.

QCL is an index that indicates a statistical property of a signal/channel. When, for example, a certain signal/channel and another signal/channel have a QCL relation, the QCL relation may mean that it is possible to assume that at least one of a Doppler shift, a Doppler spread, an average delay, a delay spread and a spatial parameter (e.g., spatial reception parameter (spatial Rx parameter)) is identical (at least one of these parameters is quasi co-located) between a plurality of these different signals/channels.

In addition, the spatial reception parameter may be associated with a reception beam (e.g., reception analog beam) of the UE, and the beam may be specified based on spatial QCL. The QCL (or at least one element of the QCL) in the present disclosure may be read as spatial QCL (sQCL).

A plurality of types of QCL (QCL types) may be specified. For example, four QCL types A to D whose parameters (or parameter sets) that can be assumed identical are different may be provided, and the parameters are as follows:

QCL type A: Doppler shift, Doppler spread, average delay and delay spread,
QCL type B: Doppler shift and Doppler spread,
QCL type C: Doppler shift and average delay, and
QCL type D: spatial reception parameter.

A UE's assumption that a given CORESET, channel or reference signal has a specific QCL (e.g., QCL type D) relation with another CORESET, channel or reference signal may be referred to as a QCL assumption.

The UE may determine at least one of a transmission beam (Tx beam) and a reception beam (Rx beam) of the signal/channel based on a TCI state or the QCL assumption of the signal/channel.

The TCI state may be, for example, information related to QCL of a target channel (or a Reference Signal (RS) for the target channel) and another signal (e.g., another Downlink Reference Signal (DL-RS)). The TCI state may be configured (instructed) by a higher layer signaling, a physical layer signaling or a combination of these signalings.

The physical layer signaling may be, for example, Downlink Control Information (DCI).

A channel to which the TCI state is configured (indicated) may be at least one of, for example, a Physical Downlink Shared Channel (PDSCH), a Physical Downlink Control Channel (PDCCH), a Physical Uplink Shared Channel (PUSCH) and a Physical Uplink Control Channel (PUCCH).

Furthermore, an RS that has the QCL relation with the channel may be at least one of, for example, a Synchronization Signal Block (SSB), a Channel State Information Reference Signal (CSI-RS) and a Sounding Reference Signal (SRS).

The SSB is a signal block including at least one of a Primary Synchronization Signal (PSS), a Secondary Synchronization Signal (SSS) and a Physical Broadcast Channel (PBCH). The SSB may be referred to as an SS/PBCH block.

An information element of the TCI state ("TCI-state IE" of RRC) configured by a higher layer signaling may include one or a plurality of pieces of QCL information ("QCL-Info"). The QCL information may include at least one of information (DL-RS related information) related to a DL-RS that is in a QCL relation, and information (QCL type information) that indicates a QCL type. The DL-RS related information may include information such as a DL-RS index (e.g., an SSB index or a non-zero power CSI-RS resource ID), an index of a cell in which the RS is located, and a Bandwidth Part (BWP) at which the RS is located.

<TCI State for PDCCH>

Information related to QCL of a PDCCH (or a DMRS antenna port associated with the PDCCH) and a given DL-RS may be referred to as a TCI state for the PDCCH.

The UE may decide the TCI state for a UE-specific PDCCH (CORESET) based on a higher layer signaling.

For example, one or a plurality of (K) TCI states may be configured to the UE per CORESET by an RRC signaling (ControlResourceSet information element). Furthermore, the UE may activate one or a plurality of TCI states per CORESET by using an MAC CE. The MAC CE may be referred to as a TCI State Indication for a UE-specific PDCCH MAC CE. The UE may monitor the CORESET based on an active TCI state associated with the CORESET.

<TCI State for PDSCH>

Information related to QCL of a PDSCH (or a DMRS antenna port associated with the PDSCH) and a given DL-RS may be referred to as a TCI for the PDSCH.

M (M≥1) TCI states for PDSCHs (QCL information of the M PDSCHs) may be notified (configured) to the UE by a higher layer signaling. In addition, the number of TCI states M configured to the UE may be limited according to at least one of UE capability and a QCL type.

Downlink Control Information (DCI) used to schedule a PDSCH may include a given field (that may be referred to as, for example, a TCI field or a TCI state field) that indicates a TCI state for the PDSCH. The DCI may be used to schedule a PDSCH of one cell, and may be referred to as, for example, DL DCI, a DL assignment, a DCI format 1_0 and a DCI format 1_1.

Whether or not the TCI field is included in the DCI may be controlled based on information notified from a base station to the UE. The information may be information (TCI-PresentInDCI) that indicates whether the TCI field is present or absent in the DCI. The information may be configured to the UE by, for example, the higher layer signaling.

When the DCI includes a TCI field of x bits (e.g., x=3), the base station may configure TCI states of $2^x$ (e.g., 8 in a case of x=3) types at maximum to the UE in advance by using a higher layer signaling. A value of a TCI field (TCI field value) in DCI may indicate one of TCI states configured in advance by the higher layer signaling.

When TCI states of more than 8 types are configured to the UE, the TCI states of 8 types or less may be activated (or indicated) by using an MAC CE. The MAC CE may be referred to as a TCI States Activation/Deactivation for a UE-specific PDSCH MAC CE. The value of the TCI field in the DCI may indicate one of the TCI states activated by the MAC CE.

The MAC CE is used to indicate a TCI state that is mapped on a code point of the TCI field of the DCI among TCI state IDs configured by an RRC signaling, and activate the TCI state. The activated TCI states may be mapped on code point values 0 to $2^x-1$ (e.g., 7 in a case of x=3) of the above TCI field in an ascending order or a descending order of the TCI state IDs.

When a slot for transmitting Hybrid Automatic Repeat reQuest ACKnowledgement (HARQ-ACK) for a PDSCH that has provided the above MAC CE is n, the UE may apply activation/deactivation (mapping of the TCI field in the DCI and the TCI state) that is based on the MAC CE from a slot n+3*(the number of slots in a subframe)+1. That is, update of the code point of the TCI field based on the above MAC CE may be enabled in the slot n+3*(the number of slots in a subframe)+1.

When a time offset between reception of DL DCI and reception of a PDSCH associated with the DCI is a given threshold or more, the UE may assume that an RS in the TCI state with respect to a QCL type parameter given by a TCI state indicated by the DCI, and DMRS ports of a PDSCH of a serving cell are quasi co-located ("the DM-RS ports of PDSCH of a serving cell are quasi co-located with the RS(s) in the TCI state with respect to the QCL type parameter(s) given by the indicated TCI state").

The time offset between reception of the DL DCI and reception of the PDSCH associated with the DCI may be referred to as a scheduling offset.

Furthermore, the above given threshold may be referred to as, for example, a "Threshold", a "Threshold for offset between a DCI indicating a TCI state and a PDSCH scheduled by the DCI", "Threshold-Sched-Offset", a scheduling offset threshold or a scheduling offset threshold.

The scheduling offset threshold may be based on UE capability, or may be based on latency relative to, for example, decoding of a PDCCH and beam switching. Information of the scheduling offset threshold may be configured by the base station by using a higher layer signaling, or may be transmitted from the UE to the base station.

Furthermore, when the scheduling offset is less than the scheduling offset threshold, the UE may assume that an RS in a TCI state with respect to a QCL parameter used for a PDCCH QCL indication associated with the lowest CORESET-ID in the latest (last) slot in which one or more Control Resource Sets (CORESETs) within the active BWP of the serving cell are configured for the UE, and the DMRS ports of the PDSCH of the serving cell are quasi co-located, (the DM-RS ports of PDSCH of a serving cell are quasi co-located with the RS(s) in the TCI state with respect to the QCL parameter(s) used for PDCCH quasi co-location indication of the lowest CORESET-ID in the latest slot in which one or more CORESETs within the active BWP of the serving cell are configured for the UE).

For example, the UE may assume that the DMRS port of the above PDSCH is quasi co-located with a DL-RS that is based on the TCI state activated for the CORESET associated with the above lowest CORESET-ID. The latest slot may be, for example, a slot for receiving DCI for scheduling the above PDSCH.

In addition, the CORESET-ID may be an ID (an ID for identifying a CORESET) configured by an RRC information element "ControlResourceSet".

Figure 2:
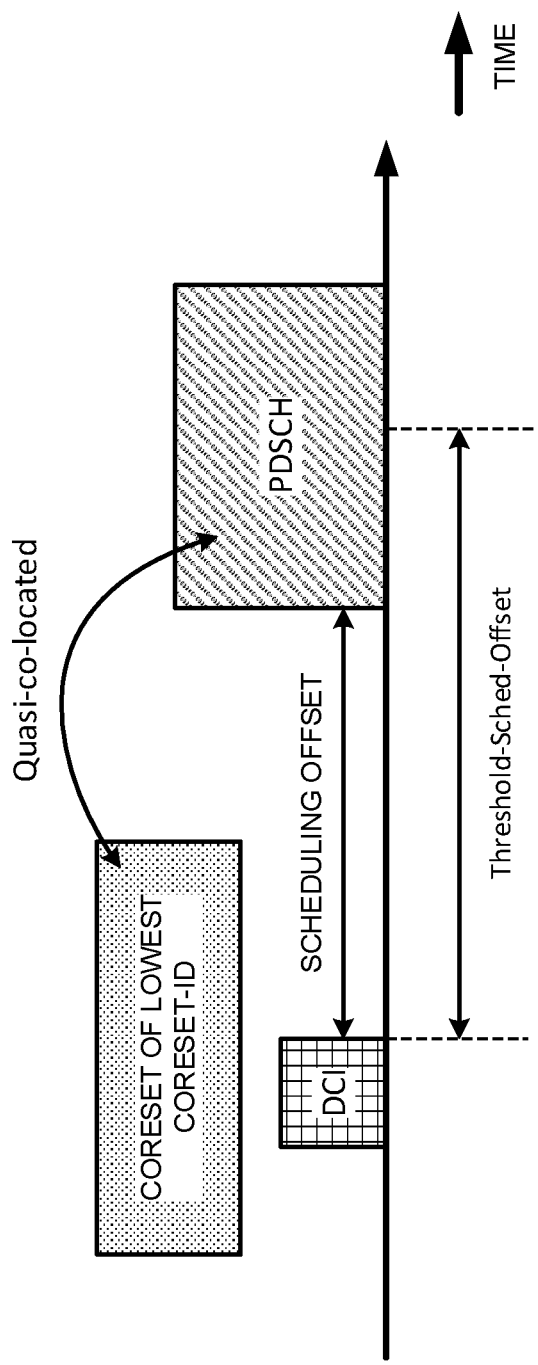
FIG. 2 is a diagram illustrating one example of a QCL assumption of a DMRS port of a PDSCH.

FIG. 2 is a diagram illustrating one example of a QCL assumption of a DMRS port of a PDSCH. In this example, a scheduling offset is smaller than a scheduling offset threshold. Consequently, the UE may assume that the DMRS port of the PDSCH and an RS (e.g., a DMRS for a PDCCH) in the TCI state for a PDCCH associated with a lowest CORESET-ID in a latest slot are quasi co-located.

As described above, each TCI state can indicate (can include) QCL information for a PDSCH. One or more TCI states (one or more pieces of QCL information for a PDSCH) may be notified (configured) to the user terminal from the radio base station by a higher layer signaling (e.g., RRC signaling). In addition, the number of TCI states configured to the user terminal may be restricted according to a QCL type.

DCI (DL assignment) used to schedule a PDSCH may include a given field (TCI state field) that indicates a TCI state (QCL information for the PDSCH). The TCI state field may include a given number of bits (e.g., 3 bits). Whether or not the TCI state field is included in DCI may be controlled by notification (e.g., higher layer signaling) from the radio base station.

When, for example, the DCI includes the TCI state field of 3 bits, the radio base station may configure the TCI states of 8 types at maximum to the user terminal in advance by a higher layer signaling. A value of the TCI state field (TCI state field value) in the DCI may indicate one of TCI states configured in advance by the higher layer signaling.

When TCI states of more than 8 types are configured to the user terminal, the TCI states of 8 types or less may be activated (or indicated) by a Medium Access Control Control Element (MAC Control Element: MAC CE). The value of the TCI state field in the DCI may indicate one of TCI states activated by the MAC CE.

The user terminal may determine QCL of a PDSCH (or a DMRS port of the PDSCH) based on the TCI state (QCL information for the PDSCH) indicated by the DCI. For example, assuming that a DMRS port (or a DMRS port group) of a PDSCH of the serving cell is quasi co-located with a DL-RS associated with the TCI state notified by the DCI, the user terminal controls reception processing (e.g., decoding processing and/or demodulation processing) of the PDSCH. Consequently, it is possible to improve PDSCH reception accuracy.

It is supposed that, when one or a plurality of TRPs are used for transmission, configurations of, for example, TCI states differ between one TRP and a plurality of TRPs.

For example, how to instruct whether to use one TRP or to use a plurality of TRPs for transmission is not clear. For example, how a DCI field changes between a case where one TRP is used and a case where a plurality of TRPs are used is not clear.

Hence, the inventors of the present disclosure have conceived configuring one mode of a plurality of modes associated with different operations of one or more transmission points to the UE. Consequently, it is possible to switch the different operations of the one or more transmission points.

Embodiments according to the present disclosure will be described in detail below with reference to the drawings. Each of the following embodiments may be each applied alone or may be applied in combination.

In the present disclosure, the higher layer signaling may be one or a combination of, for example, a Radio Resource Control (RRC) signaling, a Medium Access Control (MAC) signaling and broadcast information.

The MAC signaling may use, for example, an MAC Control Element (CE) or an MAC Protocol Data Unit (PDU). The broadcast information may be, for example, a Master Information Block (MIB), a System Information Block (SIB), Remaining Minimum System Information (RMSI) or Other System Information (OSI).

In the present disclosure, a TRP, a transmission point, a DMRS port group, an MIMO layer, a panel, a cell, a carrier, a Component Carrier (CC), a PDSCH, a codeword and a base station may be interchangeably read.

Multi-TRP transmission may be read as, for example, multi-panel transmission, multi-panel TRP transmission, reception of a plurality of PDSCHs from different TRPs, reception of a plurality of PDSCHs associated with different DMRS port groups, a case where a plurality of DMRS port groups are configured, or a case where at least part of a plurality of PDSCH resources overlap.

New parameters such as a new DCI format, a new field and a new RNTI may be specified in a specific release (e.g., Rel. 16 and subsequent releases), and may be read as a parameter that is not specified in past releases (e.g., Rel. 15) before the specific release.

(Radio Communication Method)

Embodiment 1

A plurality of transmission modes may be defined.

Figure 3A:
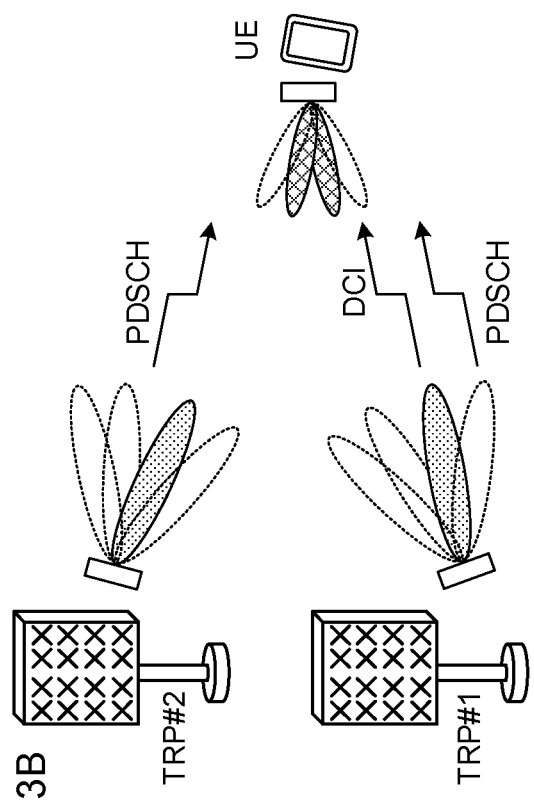
FIGS. 3A to 3D are diagrams illustrating one example of a transmission mode.

A plurality of transmission modes may include at least one of next transmission modes.
  Single mode
  Single master mode
  Master slave mode
  Multi-master mode As illustrated in FIG. 3A, the single mode uses one TRP #1. The TRP #1 transmits control information (DCI), and transmits data (PDSCH) scheduled by the control information. The single mode may be similar to transmission that uses one TRP according to Rel. 15 NR.

Figure 3B:
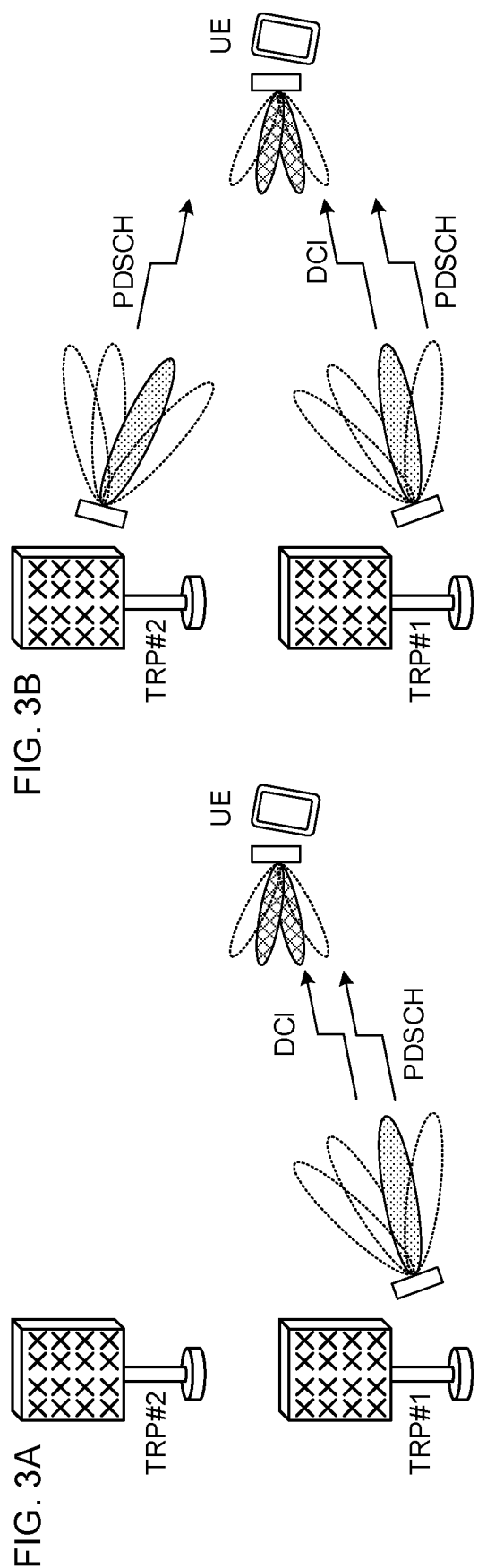

As illustrated in FIG. 3B, the single master mode uses a plurality of TRPs (e.g., TRPs #1 and #2). One TRP (e.g., the TRP #1 or a master TRP) of a plurality of TRPs transmits control information. The control information schedules a plurality of items of data. A plurality of TRPs respectively transmit a plurality of items of data.

Figure 3C:
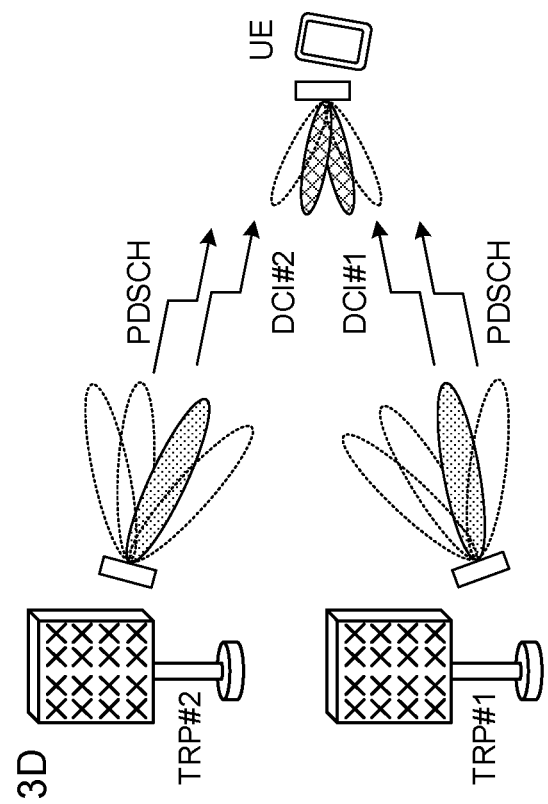

As illustrated in FIG. 3C, the master-slave mode uses a plurality of TRPs (e.g. TRPs #1 and #2). A plurality of TRPs respectively transmit a plurality of pieces of relevant control information. At least one of a plurality of pieces of control information depends on another control information. A plurality of pieces of control information schedule a plurality of items of data. A plurality of TRPs respectively transmit a plurality of items of data.

When a plurality of TRPs are the TRPs #1 and #2, and the TRP #1 (master TRP) and the TRP #2 (slave TRP) transmit a DCI part 1 and a DCI part 2, respectively, the DCI part 2 may depend on the DCI part 1. The UE receives a PDSCH of the TRP #1 by using the DCI part 1. The UE may receive the DCI part 2 by using the DCI part 1, or may receive a PDSCH of the TRP #2 by using both of the DCI part 1 and the DCI part 2.

The DCI part 1 may include assist information for decoding the DCI part 2. The DCI part 2 may be transmitted in the same slot as that of the DCI part 1.

The UE may decode the DCI part 2 by using one of pieces of next information indicated by the DCI part 1.
  A direction of the DCI part 2 (whether to schedule DL (DL DCI) or to schedule UL (UL DCI))
  A DCI format of the DCI part 2
  Information (e.g., DMRS port group) associated with a TRP that transmits the DCI part 2
  A payload size of the DCI part 2
  Whether or not the DCI part 2 is transmitted in a given time range (e.g., identical slot)
  The number of pieces of other DCI or a total number of pieces of DCI to be transmitted in the given time range (e.g., identical slot)
  A PDCCH configuration ID (PDCCH-Config ID) of the DCI part 2
  A search space ID (SearchSpace ID) of the DCI part 2
  A control resource set ID (ControlResourceSet ID) of the DCI part 2
  An aggregation level of the DCI part 2
  A CCE index of the DCI part 2
  The DCI format of the DCI part 2
  A relationship of time resource locations of the DCI part 2 and the DCI part 1
  A relationship of frequency resource locations of the DCI part 2 and the DCI part 1

When the TRPs #1 and #2 transmit the DCI part 1 and the DCI part 2, respectively, the DCI part 1 and the DCI part 2 may depend on each other. The UE may receive the PDSCH of the TRP #1 and the PDSCH of the TRP #2 by using both of the DCI part 1 and the DCI part 2.

Figure 3D:
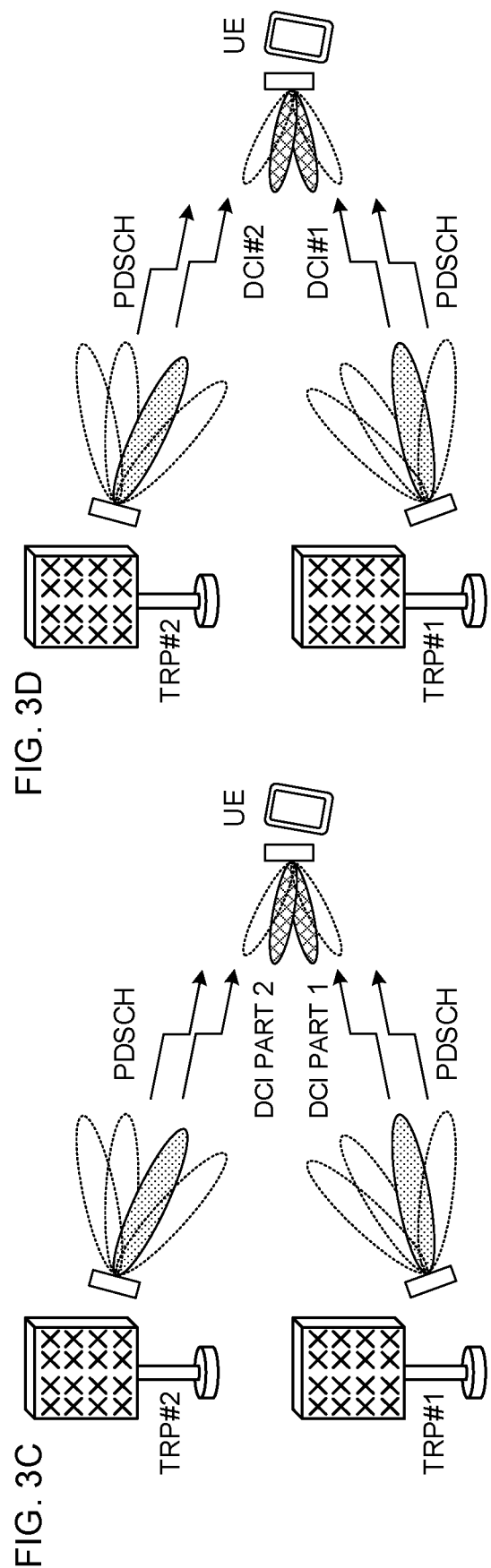

As illustrated in FIG. 3D, the multi-master mode uses a plurality of TRPs (e.g., TRPs #1 and #2). A plurality of TRPs respectively transmit a plurality of pieces of independent control information. A plurality of pieces of control information respectively schedule a plurality of items of data. A plurality of TRPs respectively transmit a plurality of items of data.

The single mode that uses only one TRP may be referred to as a single TRP mode, and at least one of the single master mode, the master-slave mode and the multi-master mode that use a plurality of TRPs may be referred to as a multi-TRP mode.

The transmission modes may be read as, for example, TRP modes, modes or types. A transmission mode that schedules a plurality of PDSCHs associated with a plurality of TRPs by using one DCI may be read as single DCI, or a transmission mode that schedules a plurality of PDSCHs associated with a plurality of TRPs by using a plurality of pieces of DCI may be read as multi-DCI.

A plurality of transmission modes may be identified based on numbers or alphabets. For example, the single mode, the single master mode, the master-slave mode and the multi-master mode may be referred to as a first mode, a second mode, a third mode and a fourth mode, types 1, 2, 3 and 4, or types A, B, C and D, respectively.

An order and the number of a plurality of transmission modes are not limited to these. A plurality of transmission modes may include transmission modes other than the single mode, the single master mode, the master-slave mode and the multi-master mode.

one or more transmission modes of the single mode, the single master mode, the master-slave mode and the multi-master mode may be specified in a specification.

one or more transmission modes of the single mode, the single master mode, the master-slave mode and the multi-master mode may not be specified in the specification.

A transmission mode selected from part of the single mode, the single master mode, the master-slave mode and the multi-master mode may be configured to the UE by a higher layer parameter or an L1 parameter.

According to above embodiment 1, the UE can switch a plurality of transmission modes that operations of one or more TRPs are different.

Embodiment 2

A transmission mode may be configured to a UE by a higher layer signaling.

The transmission mode may be configured to the UE by an RRC signaling (RRC information element).

The RRC information element may be a 2-bit bit sequence or an integer type. 2-bit values {00, 01, 10, 11} may be associated with transmission modes {single mode, single master mode, master-slave mode, multi-master mode}, respectively. The RRC information element may be another type (a string type that indicates the transmission mode).

The number of configurable transmission modes may be larger than 4. In this case, the number of values of the RRC information elements may be larger than 4.

The transmission mode of the UE may be activated by an MAC CE. The transmission mode may be reconfigured to the UE by the MAC CE. A plurality of transmission mode candidates for activation or reconfiguration may be configured in advance by the RRC information element, or may be specified in the specification.

The UE may receive a new DCI format including a specific field related to the transmission mode.

The specific field may be a TCI field (example 1 described below). The TCI field may indicate a different TCI state to be applied to a different transmission mode that uses a plurality of TRPs.

The specific field may be at least one of a frequency domain resource allocation field, a time domain resource allocation field, and other fields (examples 2 to 4 described below).

In the new DCI format for the single mode and the single master mode, the specific field may not be added to a legacy DCI format.

A value of a specific field in DCI transmitted from one TRP (slave) for the master slave mode may depend on a value of a specific field in DCI transmitted from another TRP (master).

Specific fields in pieces of DCI transmitted respectively from a plurality of TRPs may be independent for the multi-master mode.

Example 1

A specific field may be a TCI field of a specific DCI format (e.g., a DCI format used to schedule a PDSCH or a DCI format 1_1). A different TCI field may be used according to the transmission mode.

A TCI field in the single mode may be similar to that according to Rel. 15 NR (the TCI field according to Rel. 15 NR may be reused).

When that a TCI state is instructed to the UE by DCI is not configured by a higher layer in the single mode (a higher layer parameter (e.g., tci-PresentInDCI) that indicates that a TCI field is present in DCI is not enabled), the TCI field may be 0 bit.

When that the TCI state is instructed to the UE by the DCI is configured by the higher layer in the single mode (the higher layer parameter that indicates that the TCI field is present in the DCI is enabled), the TCI field may be 3 bits. A value (code point) of this TCI field may be mapped on up to eight TCI states.

When that the TCI state is instructed to the UE by the DCI is not configured by the higher layer in the single master mode, the TCI field may be 0 bit.

When that the TCI state is instructed to the UE by the DCI is configured by the higher layer in the single master mode, the TCI field may be at least one of next option 1 to option 3.

<<Option 1>>

The TCI field may be 3×M bits. In this regard, M may represent the number of TRPs. M may be configured by a higher layer parameter or an L1 parameter. The TCI field may include 3 bits respectively associated with M TRPs. A 3-bit value (code point) associated with one TRP may be mapped on up to eight TCI states similar to Rel. 15 NR.

<<Option 2>>

The TCI field may be 3×2 bits. In this regard, it may be assumed that the number of TRPs is 2. The TCI field may include 3 bits respectively associated with two TRPs. A 3-bit value (code point) associated with one TRP may be mapped on up to eight TCI states similar to Rel. 15 NR.

<<Option 3>>

The TCI field may be X bits. X may be smaller than 6. It may be assumed that the number of TRPs is 2. For example, TCI state candidates that are not applied may be excluded from a plurality of TCI state candidates in option 2. Furthermore, for example, an X-bit value (code point) of a TCI field may be mapped on X combinations that are combinations of two TCI states respectively associated with two TRPs. Furthermore, for example, the X-bit value (code point) of the TCI field may be mapped on up to X TCI states or X IDs of the TCI states. In this case, the two TRPs may use the same TCI state or the same ID. An ID of one TCI state may indicate a different TCI state (beam) per TRP.

When that a TCI state is instructed to the UE by DCI is not configured by a higher layer in the master-slave mode, the TCI field in a DCI part 1 may be 0 bit.

When that the TCI state is instructed to the UE by the DCI is configured by the higher layer in the master-slave mode, the TCI field in the DCI part 1 may be 3 bits. A value (code point) of this TCI field may be mapped on up to eight TCI states.

When that the TCI state is instructed to the UE by the DCI is not configured by the higher layer in the master-slave mode, the TCI field in a DCI part 2 may be 0 bit.

When that the TCI state is instructed to the UE by the DCI is configured by the higher layer in the master-slave mode, the TCI field in the DCI part 2 may be 3 bits. A value (code point) of this TCI field may be mapped on up to eight TCI states.

When that a TCI state is instructed to the UE by DCI is not configured by a higher layer in the multi-master mode, the TCI field in DCI #1 may be 0 bit.

When that the TCI state is instructed to the UE by the DCI is configured by the higher layer in the multi-master mode, the TCI field in DCI #1 may be 3 bits. A value (code point) of this TCI field may be mapped on up to eight TCI states.

When that the TCI state is instructed to the UE by the DCI is not configured by the higher layer in the multi-master mode, the TCI field in DCI #2 may be 0 bit.

When that the TCI state is instructed to the UE by the DCI is configured by the higher layer in the multi-master mode, the TCI field in DCI #2 may be 3 bits. A value (code point) of this TCI field may be mapped on up to eight TCI states.

Example 2

A specific field may be a carrier indicator field.

When the carrier indicator field is configured to the UE by a higher layer parameter (e.g., CrossCarrierSchedulingConfig) in Rel. 15-NR, the carrier indicator field in DCI of a scheduling cell may be 3 bits. The carrier indicator field in this case may indicate a value associated with a scheduled cell. The value associated with the scheduled cell may be configured by the higher layer parameter. The value associated with the scheduled cell may be 0 that indicates the scheduling cell (self-carrier scheduling), or one of 1 to 7 that indicates a cell other than the scheduling cell (cross-carrier scheduling).

When the carrier indicator field is configured to the UE by a higher layer parameter in Rel. 15-NR, the carrier indicator field in the serving cell may be 0 bit.

In the single mode, the carrier indicator field may be 0 or 3 bits similar to that according to Rel. 15 NR (the TCI field according to Rel. 15 NR may be reused).

In the single master mode, the carrier indicator field may be one of next options 1 and 2.

<<Option 1>>

The number of TRPs may be 2.

When the carrier indicator field is not configured to the UE by a higher layer parameter, the carrier indicator field may be 0 bit similar to that according to Rel. 15 NR. When the carrier indicator field is configured to the UE by the higher layer parameter, the carrier indicator field may be 6 bits. These six bits may include 3 bits respectively associated with two TRPs. A 3-bit value (code point) associated with one TRP may be a value associated with the scheduled cell similar to Rel. 15 NR.

<<Option 2>>

When the carrier indicator field is not configured to the UE by the higher layer parameter, the carrier indicator field may be 0 bit similar to that according to Rel. 15 NR. When the carrier indicator field is configured by the higher layer parameter, the carrier indicator field may be 3 bits. This 3-bit value may indicate the same scheduled cell for a plurality of TRPs, or may be a value associated with the scheduled cell similar to Rel. 15 NR.

In the master slave mode, the carrier indicator field in the DCI part 1 may be 0 or 3 bits similar to that according to Rel. 15 NR.

In the master slave mode, the carrier indicator field in the DCI part 2 may be one of next options 1 and 2.

<<Option 1>>

The carrier indicator field in the DCI part 2 may be 0 bit.

<<Option 2>>

The carrier indicator field in the DCI part 2 may be 3 bits. This 3-bit value (code point) may be a value associated with the scheduled cell similar to Rel. 15 NR.

In the multi-master mode, the carrier indicator field in the DCI #1 may be 0 or 3 bits similar to that according to Rel. 15 NR.

In the multi-master mode, the carrier indicator field in the DCI #2 may be 0 or 3 bits similar to that according to Rel. 15 NR.

Example 3

The specific field may be at least one of a Bandwidth Part (BWP) indicator field, a Modulation and Coding Scheme (MCS) field, a New Data Indicator (NDI) field, and a Redundancy Version (RV) field.

In the single mode, the specific field may be similar to that according to Rel. 15 NR (the specific field according to Rel. 15 NR may be reused).

In the single master mode, the specific field may be similar to that according to Rel. 15 NR (the specific field according to Rel. 15 NR may be reused).

In the master-slave mode, the specific field in the DCI part 1 may be similar to that according to Rel. 15 NR (the specific field according to Rel. 15 NR may be reused).

In the master-slave mode, the specific field in the DCI part 2 may be 0 bit, or may be all 0 with a given length (e.g., the length according to Rel. 15 NR).

In the multi-master mode, the pieces of DCI #1 and #2 may be one of next options 1 and 2.

<<Option 1>>

The specific field in the DCI #1 and the specific field in the DCI #2 may have the same value.

<<Option 2>>

The specific field in the one DCI of the DCI #1 and the DCI #2 may have a value, and the specific field in the other DCI may be all 0 with a given length (e.g., the length according to Rel. 15 NR and a length of the specific field in the another DCI).

Example 4

The specific field may be at least one of a Virtual Resource Block (VRB)-to-Physical Resource Block (PRB) mapping (VRB-to-PRB mapping) field, a PRB bundling size indicator field, an SRS request field, a Code Block Group (CBG) Transmission Information (CBGTI) field, a CBG Flushing out Information (CBGFI) field, and a DMRS sequence initialization field.

In the single mode, the specific field may be similar to that according to Rel. 15 NR (the specific field according to Rel. 15 NR may be reused).

In the single master mode, the specific field may be similar to that according to Rel. 15 NR (the specific field according to Rel. 15 NR may be reused).

In the master-slave mode, the specific field in the DCI part 1 may be similar to that according to Rel. 15 NR (the specific field according to Rel. 15 NR may be reused).

In the master-slave mode, the specific field in the DCI part 2 may be similar to that according to Rel. 15 NR (the specific field according to Rel. 15 NR may be reused).

In the multi-master mode, the specific field in each of the pieces of DCI #1 and #2 may be similar to that according to Rel. 15 NR (the specific field according to Rel. 15 NR may be reused).

According to above embodiment 2, it is possible to switch a plurality of transmission modes, and perform flexible control according to a transmission mode.

Embodiment 3

A transmission mode may be instructed to a UE by specific DCI.

The specific DCI may be at least one of next embodiments 3-1 and 3-2.

Embodiment 3-1

The specific DCI may be a new DCI format.

The transmission mode may be instructed to the UE by a new field (new parameter) in the new DCI format, or the transmission mode may be reconfigured to the UE. The transmission mode configured by a higher layer may be reconfigured to the UE by the new DCI format.

The new DCI format may include a 2-bit new field related to the transmission mode. 2-bit values {00, 01, 10, 11} may be associated with transmission modes {single mode, single master mode, master-slave mode, multi-master mode}, respectively.

The transmission mode may be reconfigured to the UE by the parameter in response to a change in a location of the UE in a cell.

The number of configurable transmission modes may be larger than 4. In this case, the number of bits of the parameter may be larger than 2.

The new DCI format may include 1-bit new field related to the transmission mode. 1-bit values {0, 1} may be associated with transmission modes {single TRP mode (single mode), multi-TRP mode (at least one of the single master mode, the master-slave mode and the multi-master mode)}, respectively.

The transmission mode may be reconfigured to the UE by the parameter in response to a change in the location of the UE in the cell. Multi-TRP transmission may be reconfigured from multi-panel TRP transmission (e.g., single mode) to the UE by the parameter.

When receiving a plurality of PDCCHs transmitted respectively from a plurality of TRPs for an instruction of the transmission mode, the UE blind-decodes multiple combinations, and therefore a UE load is great.

Hence, a specific transmission mode that uses only one PDCCH may be instructed to the UE by the new DCI format. The specific transmission mode may be at least one of the single mode and the single master mode that transmit only one PDCCH. The UE may not expect to receive 2 or more new DCI formats. Consequently, it is possible to suppress the UE load.

When the transmission mode that transmits only one PDCCH is instructed, at least one of next features 1 to 3 may be used.

<<Feature 1>>

A bit width of each field other than the new field in the new DCI format may be equal between pieces of DCI that instruct different transmission modes.

<<Feature 2>>

The UE may assume a default TCI state of each PDSCH.

When, for example, a time offset (scheduling offset) between reception of DCI and reception of a PDSCH associated with the DCI is a given threshold or more, the UE may assume that a TCI state of the PDSCH is a TCI state instructed by the associated DCI (a DMRS port of the PDSCH is quasi co-located with an RS used for the TCI state instructed by the associated DCI).

When, for example, the scheduling offset is less than the given threshold, the UE may assume that a TCI state of a PDSCH of a serving cell is a TCI state of a specific PDCCH of the serving cell (e.g., a DMRS port of the PDSCH of the serving cell is quasi co-located with an RS used to instruct the TCI state of the specific PDCCH of the serving cell). The specific PDCCH may be a PDCCH of a lowest CORESET-ID of a specific TRP-ID in a latest slot in which one or more CORESETs within an active BWP of the serving cell have been configured. The specific TRP-ID may be a lowest or highest TRP-ID in the slot, or may be an ID of a TRP used to transmit the PDSCH.

<<Feature 3>>

When one DCI schedules a plurality of PDSCHs from a plurality of TRPs, completely same frequency domain resource allocation and time domain resource allocation may be applied to a plurality of TRPs based on the DCI.

Embodiment 3-2

An instruction to change a transmission mode may be given to the UE by a specific DCI format (e.g., a DCI format 1_1 or another DCI format) including a CRC scrambled by a specific Radio Network Temporary Identifier (RNTI). The specific RNTI may be a new RNTI. The new RNTI may be an RNTI different from a Cell (C)-RNTI, a Configured Scheduling (CS)-RNTI or an MCS-C-RNTI, and may be referred to as a TRP-C-RNTI.

The specific transmission mode may be instructed to the UE by the DCI format including the CRC scrambled by the specific RNTI, or the specific transmission mode may be reconfigured to the UE. The transmission mode may be reconfigured to the UE by the DCI format in response to a change in a location of the UE in a cell.

A plurality of specific RNTIs may be associated respectively with a plurality of specific transmission modes. For example, the specific RNTI may be the C-RNTI, and the associated specific transmission mode may be the single TRP mode (single mode). The specific RNTI may be the TRP-C-RNTI, and the associated specific transmission mode may be the multi-TRP mode (at least one of the single master mode, the master-slave mode and the multi-master mode).

When receiving a plurality of PDCCHs transmitted respectively from a plurality of TRPs for an instruction of the transmission mode, the UE blind-decodes multiple combinations, and therefore a UE load is great.

Hence, the specific transmission mode may be a specific transmission mode that uses only one PDCCH, and may be at least one of the single mode and the single master mode. The UE may not expect to receive 2 or more pieces of DCI that use specific RNTIs (e.g., TRP-C-RNTIs). Consequently, it is possible to suppress the UE load.

When the transmission mode that transmits only one PDCCH is instructed, at least one of next features 1 to 3 may be used.

<<Feature 1>>

A bit width of each field in the specific DCI format may be equal between pieces of DCI (pieces of DCI that use different RNTIs) that instruct different transmission modes.

<<Feature 2>>

The UE may assume a default TCI state of each PDSCH. The default TCI state may be similar to that in embodiment 3-1.

<<Feature 3>>

When one DCI schedules a plurality of PDSCHs from a plurality of TRPs, completely same frequency domain resource allocation and time domain resource allocation may be applied to a plurality of TRPs based on the DCI.

According to above embodiment 3, the UE can switch a plurality of transmission modes that operations of one or more TRPs are different.

Another Embodiment

At least one of a bit width, an interpretation and a value of a DCI field for scheduling at least one PDSCH of multi-TRP transmission may differ according to a transmission mode. A UE may interpret the bit width and the value of the DCI field based on the transmission mode.
(Radio Communication System)

The configuration of the radio communication system according to one embodiment of the present disclosure will be described below. This radio communication system uses one or a combination of the radio communication method according to each of the above embodiments of the present disclosure to perform communication.

Figure 4:
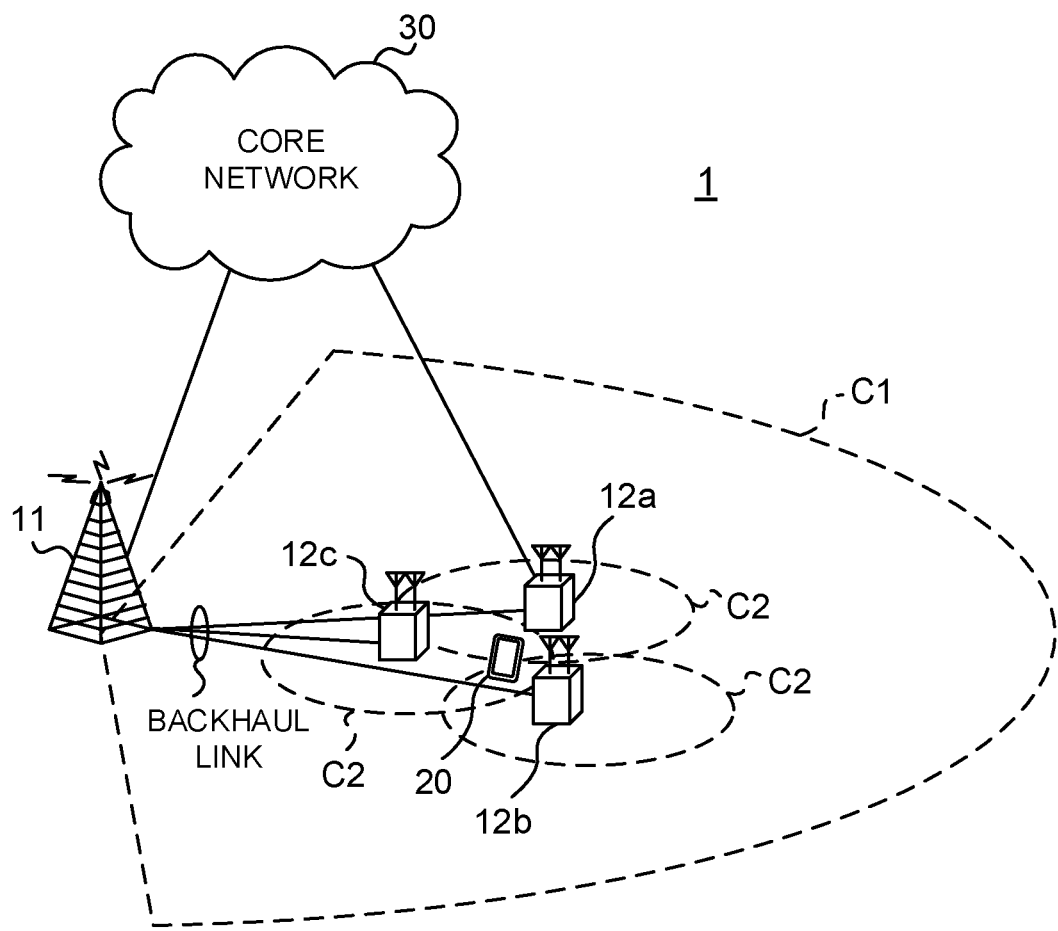
FIG. 4 is a diagram illustrating one example of a schematic configuration of a radio communication system according to one embodiment.

FIG. 4 is a diagram illustrating one example of a schematic configuration of the radio communication system according to the one embodiment. A radio communication system 1 may be a system that realizes communication by using Long Term Evolution (LTE) or the 5th generation mobile communication system New Radio (5G NR) specified by the Third Generation Partnership Project (3 GPP).

Furthermore, the radio communication system 1 may support dual connectivity between a plurality of Radio Access Technologies (RATs) (Multi-RAT Dual Connectivity (MR-DC)). MR-DC may include dual connectivity (E-UTRA-NR Dual Connectivity (EN-DC)) of LTE (Evolved Universal Terrestrial Radio Access (E-UTRA)) and NR, and dual connectivity (NR-E-UTRA Dual Connectivity (NE-DC)) of NR and LTE.

According to EN-DC, a base station (eNB) of LTE (E-UTRA) is a Master Node (MN), and a base station (gNB) of NR is a Secondary Node (SN). According to NE-DC, a base station (gNB) of NR is an MN, and a base station (eNB) of LTE (E-UTRA) is an SN.

The radio communication system 1 may support dual connectivity between a plurality of base stations in an identical RAT (e.g., dual connectivity (NR-NR Dual Connectivity (NN-DC)) where both of the MN and the SN are base stations (gNBs) according to NR).

The radio communication system 1 includes a base station 11 that forms a macro cell C1 of a relatively wide coverage, and base stations 12 (12a to 12c) that are located in the macro cell C1 and form small cells C2 narrower than the macro cell C1. The user terminal 20 may be located in at least one cell. An arrangement and the numbers of respective cells and the user terminals 20 are not limited to the aspect illustrated in FIG. 4. The base stations 11 and 12 will be collectively referred to as a base station 10 below when not distinguished.

The user terminal 20 may connect with at least one of a plurality of base stations 10. The user terminal 20 may use at least one of Carrier Aggregation (CA) and Dual Connectivity (DC) that use a plurality of Component Carriers (CCs).

Each CC may be included in at least one of a first frequency range (Frequency Range 1 (FR1)) and a second frequency range (Frequency Range 2 (FR2)). The macro cell C1 may be included in the FR1, and the small cell C2 may be included in the FR2. For example, the FR1 may be a frequency range equal to or less than 6 GHz (sub-6 GHz), and the FR2 may be a frequency range higher than 24 GHz (above-24 GHz). In addition, the frequency ranges and definitions of the FR1 and the FR2 are not limited to these, and, for example, the FR1 may correspond to a frequency range higher than the FR2.

Furthermore, the user terminal 20 may perform communication by using at least one of Time Division Duplex (TDD) and Frequency Division Duplex (FDD) in each CC.

A plurality of base stations 10 may be connected by way of wired connection (e.g., optical fibers compliant with a Common Public Radio Interface (CPRI) or an X2 interface) or radio connection (e.g., NR communication). When, for example, NR communication is used as a backhaul between the base stations 11 and 12, the base station 11 corresponding to a higher station may be referred to as an Integrated Access Backhaul (IAB) donor, and the base station 12 corresponding to a relay station (relay) may be referred to as an IAB node.

The base station 10 may be connected with a core network 30 via the another base station 10 or directly. The core network 30 may include at least one of, for example, an Evolved Packet Core (EPC), a 5G Core Network (5GCN) and a Next Generation Core (NGC).

The user terminal 20 is a terminal that supports at least one of communication schemes such as LTE, LTE-A and 5G.

The radio communication system 1 may use an Orthogonal Frequency Division Multiplexing (OFDM)-based radio access scheme. For example, on at least one of Downlink (DL) and Uplink (UL), Cyclic Prefix OFDM (CP-OFDM), Discrete Fourier Transform Spread OFDM (DFT-s-OFDM), Orthogonal Frequency Division Multiple Access (OFDMA) and Single Carrier Frequency Division Multiple Access (SC-FDMA) may be used.

The radio access scheme may be referred to as a waveform. In addition, the radio communication system 1 may use another radio access scheme (e.g., another single carrier transmission scheme or another multicarrier transmission scheme) as the radio access scheme on UL and DL.

The radio communication system 1 may use a downlink shared channel (Physical Downlink Shared Channel (PDSCH)) shared by each user terminal 20, a broadcast channel (Physical Broadcast Channel (PBCH)) and a downlink control channel (Physical Downlink Control Channel (PDCCH)) as downlink channels.

Furthermore, the radio communication system 1 may use an uplink shared channel (Physical Uplink Shared Channel (PUSCH)) shared by each user terminal 20, an uplink control channel (Physical Uplink Control Channel (PUCCH)) and a random access channel (Physical Random Access Channel (PRACH)) as uplink channels.

User data, higher layer control information and a System Information Block (SIB) are conveyed on the PDSCH. The user data and the higher layer control information may be conveyed on the PUSCH. Furthermore, a Master Information Block (MIB) may be conveyed on the PBCH.

Lower layer control information may be conveyed on the PDCCH. The lower layer control information may include, for example, Downlink Control Information (DCI) including scheduling information of at least one of the PDSCH and the PUSCH.

In addition, DCI for scheduling the PDSCH may be referred to as, for example, a DL assignment or DL DCI, and DCI for scheduling the PUSCH may be referred to as, for example, a UL grant or UL DCI. In this regard, the PDSCH may be read as DL data, and the PUSCH may be read as UL data.

A COntrol REsource SET (CORESET) and a search space may be used to detect the PDCCH. The CORESET corresponds to a resource for searching DCI. The search space corresponds to a search domain and a search method of PDCCH candidates. One CORESET may be associated with one or a plurality of search spaces. The UE may monitor a CORESET associated with a certain search space based on a search space configuration.

One search space may be associated with a PDCCH candidate corresponding to one or a plurality of aggregation levels. One or a plurality of search spaces may be referred to as a search space set. In addition, a "search space", a "search space set", a "search space configuration", a "search space set configuration", a "CORESET" and a "CORESET configuration" in the present disclosure may be interchangeably read.

Uplink Control Information (UCI) including at least one of Channel State Information (CSI), transmission acknowledgement information (that may be referred to as, for example, Hybrid Automatic Repeat reQuest ACKnowledgement (HARQ-ACK) or ACK/NACK) and a Scheduling Request (SR) may be conveyed on the PUCCH. A random access preamble for establishing connection with a cell may be conveyed on the PRACH.

In addition, downlink and uplink in the present disclosure may be expressed without adding "link" thereto. Furthermore, various channels may be expressed without adding "physical" to heads of the various channels.

The radio communication system 1 may convey a Synchronization Signal (SS) and a Downlink Reference Signal (DL-RS). The radio communication system 1 may convey a Cell-specific Reference Signal (CRS), a Channel State Information Reference Signal (CSI-RS), a DeModulation Reference Signal (DMRS), a Positioning Reference Signal (PRS) and a Phase Tracking Reference Signal (PTRS) as DL-RSs.

The synchronization signal may be at least one of, for example, a Primary Synchronization Signal (PSS) and a Secondary Synchronization Signal (SSS). A signal block including the SS (the PSS or the SSS) and the PBCH (and the DMRS for the PBCH) may be referred to as, for example, an SS/PBCH block or an SS Block (SSB). In addition, the SS and the SSB may be also referred to as reference signals.

Furthermore, the radio communication system 1 may convey a Sounding Reference Signal (SRS) and a DeModulation Reference Signal (DMRS) as UpLink Reference Signals (UL-RSs). In this regard, the DMRS may be referred to as a user terminal-specific reference signal (UE-specific reference signal).

(Base Station)

Figure 5:
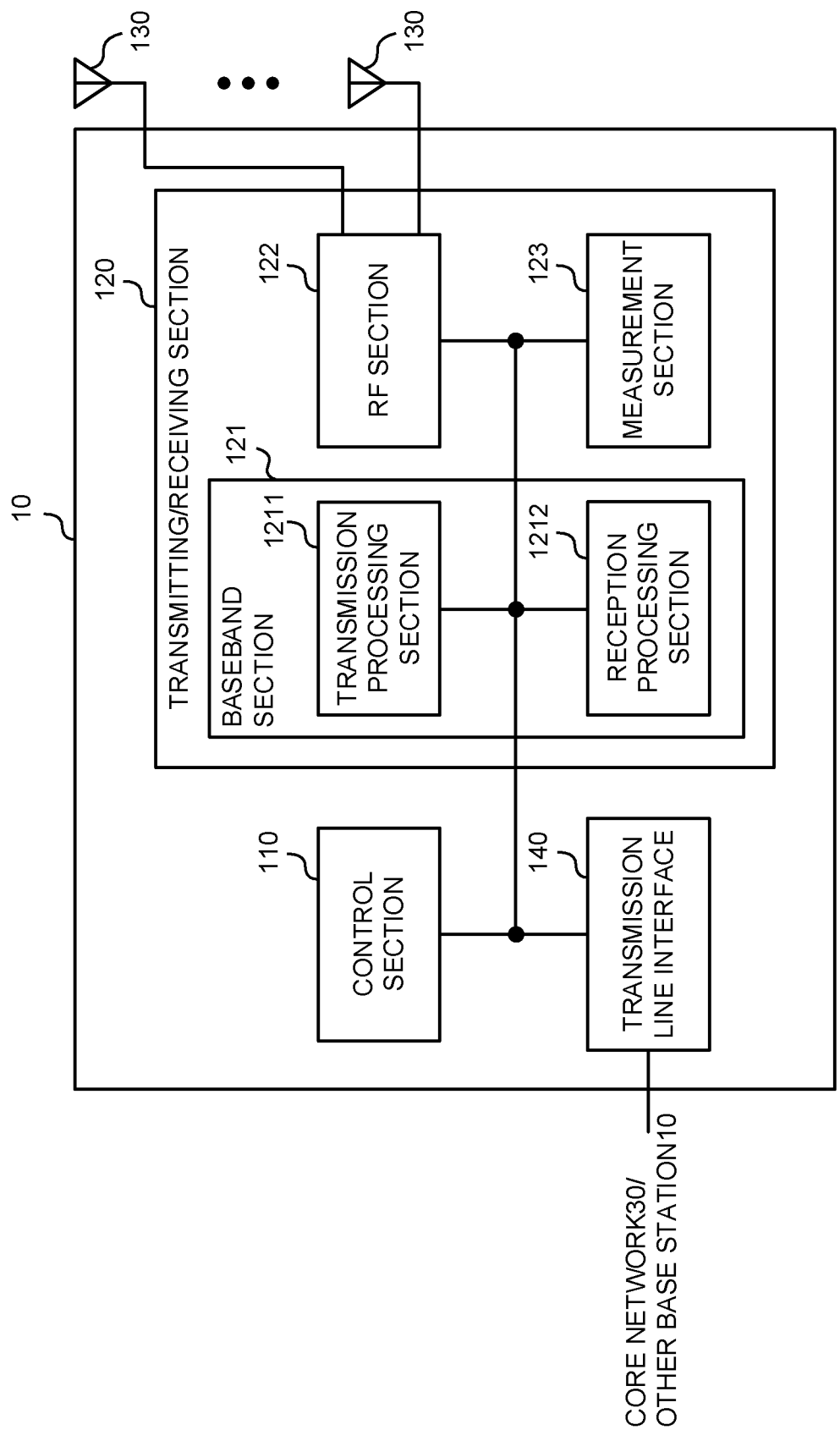
FIG. 5 is a diagram illustrating one example of a configuration of a base station according to the one embodiment.

FIG. 5 is a diagram illustrating one example of a configuration of the base station according to the one embodiment. The base station 10 includes a control section 110, a transmitting/receiving section 120, transmission/reception antennas 130 and a transmission line interface 140. In addition, the base station 10 may include one or more of each of the control sections 110, the transmitting/receiving sections 120, the transmission/reception antennas 130 and the transmission line interfaces 140.

In addition, this example mainly illustrates function blocks of characteristic portions according to the present embodiment, and may assume that the base station 10 includes other function blocks, too, that are necessary for radio communication. Part of processing of each section described below may be omitted.

The control section 110 controls the entire base station 10. The control section 110 can be composed of a controller or a control circuit described based on the common knowledge in the technical field according to the present disclosure.

The control section 110 may control signal generation and scheduling (e.g., resource allocation or mapping). The control section 110 may control transmission/reception and measurement that use the transmitting/receiving section 120, the transmission/reception antennas 130 and the transmission line interface 140. The control section 110 may generate data, control information or a sequence to be transmitted as a signal, and forward the signal to the transmitting/receiving section 120. The control section 110 may perform call processing (such as configuration and release) of a communication channel, state management of the base station 10 and radio resource management.

The transmitting/receiving section 120 may include a baseband section 121, a Radio Frequency (RF) section 122 and a measurement section 123. The baseband section 121 may include a transmission processing section 1211 and a reception processing section 1212. The transmitting/receiving section 120 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 120 may be composed as an integrated transmitting/receiving section, or may be composed of a transmitting section and a receiving section. The transmitting section may be composed of the transmission processing section 1211 and the RF section 122. The receiving section may be composed of the reception processing section 1212, the RF section 122 and the measurement section 123.

The transmission/reception antenna 130 can be composed of an antenna such as an array antenna described based on the common knowledge in the technical field according to the present disclosure.

The transmitting/receiving section 120 may transmit the above-described downlink channel, synchronization signal and downlink reference signal. The transmitting/receiving section 120 may receive the above-described uplink channel and uplink reference signal.

The transmitting/receiving section 120 may form at least one of a transmission beam and a reception beam by using digital beam forming (e.g., precoding) or analog beam forming (e.g., phase rotation).

The transmitting/receiving section 120 (transmission processing section 1211) may perform Packet Data Convergence Protocol (PDCP) layer processing, Radio Link Control (RLC) layer processing (e.g., RLC retransmission control), and Medium Access Control (MAC) layer processing (e.g., HARQ retransmission control) on, for example, the data and the control information obtained from the control section 110, and generate a bit sequence to transmit.

The transmitting/receiving section 120 (transmission processing section 1211) may perform transmission processing such as channel coding (that may include error correction coding), modulation, mapping, filter processing, Discrete Fourier Transform (DFT) processing (when needed), Inverse Fast Fourier Transform (IFFT) processing, precoding and digital-analog conversion on the bit sequence to transmit, and output a baseband signal.

The transmitting/receiving section 120 (RF section 122) may modulate the baseband signal into a radio frequency range, perform filter processing and amplification on the signal, and transmit the signal of the radio frequency range via the transmission/reception antennas 130.

On the other hand, the transmitting/receiving section 120 (RF section 122) may perform amplification and filter processing on the signal of the radio frequency range received by the transmission/reception antennas 130, and demodulate the signal into a baseband signal.

The transmitting/receiving section 120 (reception processing section 1212) may apply reception processing such as analog-digital conversion, Fast Fourier Transform (FFT) processing, Inverse Discrete Fourier Transform (IDFT) processing (when needed), filter processing, demapping, demodulation, decoding (that may include error correction decoding), MAC layer processing, RLC layer processing and PDCP layer processing to the obtained baseband signal, and obtain user data.

The transmitting/receiving section 120 (measurement section 123) may perform measurement related to the received signal. For example, the measurement section 123 may perform Radio Resource Management (RRM) measurement or Channel State Information (CSI) measurement based on the received signal. The measurement section 123 may measure received power (e.g., Reference Signal Received Power (RSRP)), received quality (e.g., Reference Signal Received Quality (RSRQ), a Signal to Interference plus Noise Ratio (SINR) or a Signal to Noise Ratio (SNR)), a signal strength (e.g., a Received Signal Strength Indicator (RSSI)) or channel information (e.g., CSI). The measurement section 123 may output a measurement result to the control section 110.

The transmission line interface 140 may transmit and receive (backhaul signaling) signals to and from apparatuses and the other base stations 10 included in the core network 30, and obtain and convey user data (user plane data) and control plane data for the user terminal 20.

In addition, the transmitting section and the receiving section of the base station 10 according to the present disclosure may be composed of at least one of the transmitting/receiving section 120 and the transmission/reception antenna 130.

Furthermore, the control section 110 may configure to the UE one mode of a plurality of modes (including at least one of transmission modes or types such as a single mode, a single master mode, a mater slave mode and a multi-master mode) associated with different operations of one or more transmission points. The transmitting/receiving section 120 may transmit one or more downlink shared channels (PDSCHs) from the one or more transmission points according to the mode.

(User Terminal)

Figure 6:
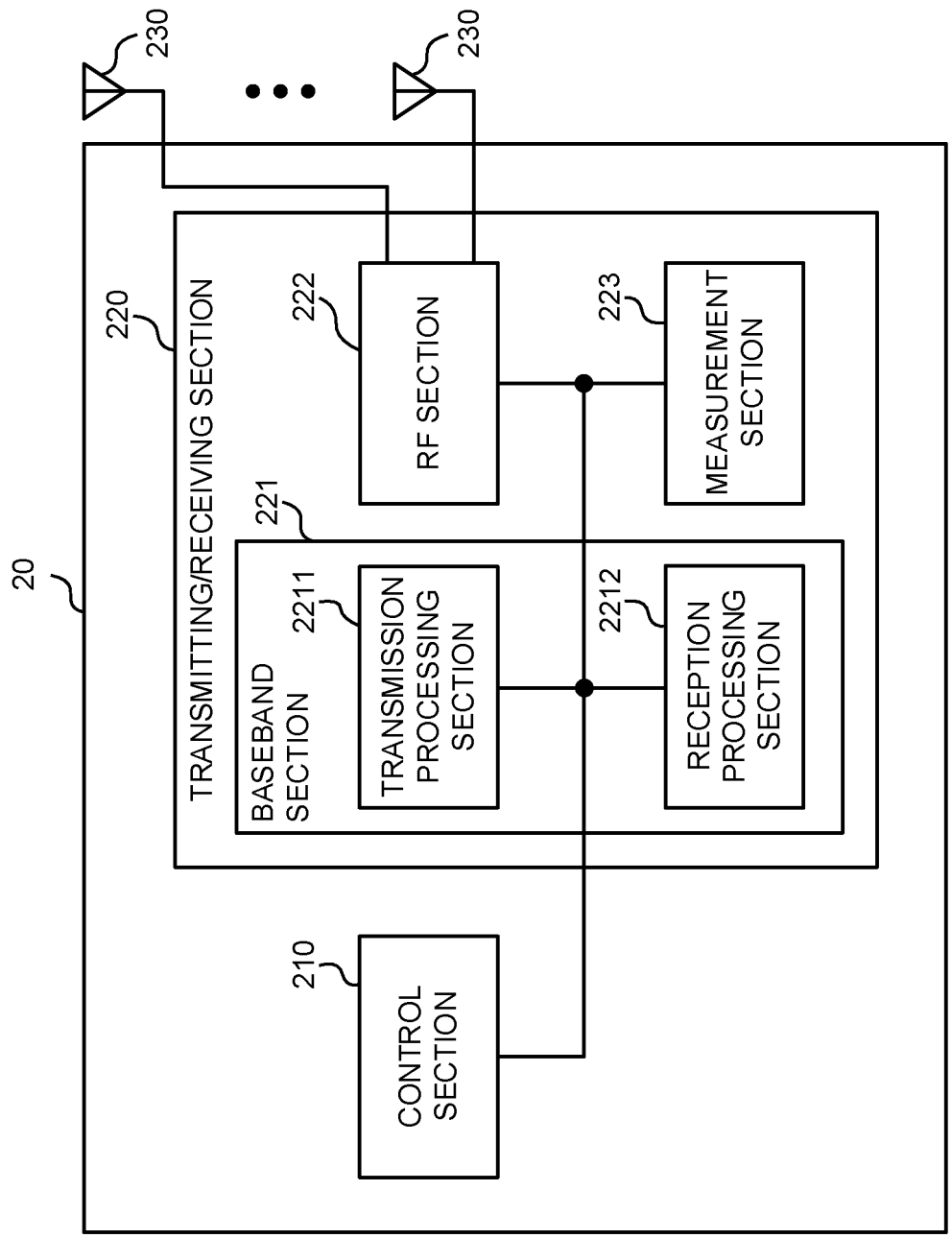
FIG. 6 is a diagram illustrating one example of a configuration of a user terminal according to the one embodiment.

FIG. 6 is a diagram illustrating one example of a configuration of the user terminal according to the one embodiment. The user terminal 20 includes a control section 210, a transmitting/receiving section 220 and transmission/reception antennas 230. In this regard, the user terminal 20 may include one or more of each of the control sections 210, the transmitting/receiving sections 220 and the transmission/reception antennas 230.

In addition, this example mainly illustrates function blocks of characteristic portions according to the present embodiment, and may assume that the user terminal 20 includes other function blocks, too, that are necessary for radio communication. Part of processing of each section described below may be omitted.

The control section 210 controls the entire user terminal 20. The control section 210 can be composed of a controller or a control circuit described based on the common knowledge in the technical field according to the present disclosure.

The control section 210 may control signal generation and mapping. The control section 210 may control transmission/reception and measurement that use the transmitting/receiving section 220 and the transmission/reception antennas 230. The control section 210 may generate data, control information or a sequence to be transmitted as a signal, and forward the signal to the transmitting/receiving section 220.

The transmitting/receiving section 220 may include a baseband section 221, an RF section 222 and a measurement section 223. The baseband section 221 may include a transmission processing section 2211 and a reception processing section 2212. The transmitting/receiving section 220 can be composed of a transmitter/receiver, an RF circuit, a baseband circuit, a filter, a phase shifter, a measurement circuit and a transmission/reception circuit described based on the common knowledge in the technical field according to the present disclosure.

The transmitting/receiving section 220 may be composed as an integrated transmitting/receiving section, or may be composed of a transmitting section and a receiving section. The transmitting section may be composed of the transmission processing section 2211 and the RF section 222. The receiving section may be composed of the reception processing section 2212, the RF section 222 and the measurement section 223.

The transmission/reception antenna 230 can be composed of an antenna such as an array antenna described based on the common knowledge in the technical field according to the present disclosure.

The transmitting/receiving section 220 may receive the above-described downlink channel, synchronization signal and downlink reference signal. The transmitting/receiving section 220 may transmit the above-described uplink channel and uplink reference signal.

The transmitting/receiving section 220 may form at least one of a transmission beam and a reception beam by using digital beam forming (e.g., precoding) or analog beam forming (e.g., phase rotation).

The transmitting/receiving section 220 (transmission processing section 2211) may perform PDCP layer processing, RLC layer processing (e.g., RLC retransmission control) and MAC layer processing (e.g., HARQ retransmission control) on, for example, the data and the control information obtained from the control section 210, and generate a bit sequence to transmit.

The transmitting/receiving section 220 (transmission processing section 2211) may perform transmission processing such as channel coding (that may include error correction coding), modulation, mapping, filter processing, DFT processing (when needed), IFFT processing, precoding and digital-analog conversion on the bit sequence to transmit, and output a baseband signal.

In this regard, whether or not to apply the DFT processing may be based on a configuration of transform precoding. When transform precoding is enabled for a certain channel (e.g., PUSCH), the transmitting/receiving section 220 (transmission processing section 2211) may perform the DFT processing as the above transmission processing to transmit the certain channel by using a DFT-s-OFDM waveform. When precoding is not enabled, the transmitting/receiving section 220 (transmission processing section 2211) may not perform the DFT processing as the above transmission processing.

The transmitting/receiving section 220 (RF section 222) may modulate the baseband signal into a radio frequency range, perform filter processing and amplification on the signal, and transmit the signal of the radio frequency range via the transmission/reception antennas 230.

On the other hand, the transmitting/receiving section 220 (RF section 222) may perform amplification and filter processing on the signal of the radio frequency range received by the transmission/reception antennas 230, and demodulate the signal into a baseband signal.

The transmitting/receiving section 220 (reception processing section 2212) may apply reception processing such as analog-digital conversion, FFT processing, IDFT processing (when needed), filter processing, demapping, demodulation, decoding (that may include error correction decoding), MAC layer processing, RLC layer processing and PDCP layer processing to the obtained baseband signal, and obtain user data.

The transmitting/receiving section 220 (measurement section 223) may perform measurement related to the received signal. For example, the measurement section 223 may perform, for example, RRM measurement or CSI measurement based on the received signal. The measurement section 223 may measure, for example, received power (e.g., RSRP), received quality (e.g., RSRQ, an SINR or an SNR), a signal strength (e.g., RSSI) or channel information (e.g., CSI). The measurement section 223 may output a measurement result to the control section 210.

In addition, the transmitting section and the receiving section of the user terminal 20 according to the present disclosure may be composed of at least one of the transmitting/receiving section 220, the transmission/reception antenna 230 and the transmission line interface 240.

Furthermore, the one mode of a plurality of modes (including at least one of transmission modes or types such as the single mode, the single master mode, the mater slave mode and the multi-master mode) associated with the different operations of the 1 or the more transmission points may be configured to the control section 210. The transmitting/receiving section 220 may transmit the one or more downlink shared channels (PDSCHs) from the one or more transmission points according to the mode.

Furthermore, a plurality of these modes may include at least one of a first mode (single mode) that a first transmission point (e.g., TRP #1) transmits first downlink control information, and the first transmission point transmits a downlink shared channel based on the first downlink control information, a second mode (single master mode) that the first transmission point transmits second downlink control information, the first transmission point transmits a downlink shared channel based on the second downlink control information, and a second transmission point (e.g., TRP #2) transmits a downlink shared channel based on the second downlink control information, a third mode (master-slave mode) that the first transmission point transmits third downlink control information (e.g., DCI part 1), the second transmission point transmits fourth downlink control information (e.g., DCI part 2) that depends on the third downlink control information, the first transmission point transmits a downlink shared channel based on the third downlink control information, and the second transmission point transmits a downlink shared channel based on the fourth downlink control information, and a fourth mode (multi-master mode) that the first transmission point transmits fifth downlink control information (e.g., DCI #1), the second transmission point transmits sixth downlink control information (e.g., DCI #2), the first transmission point transmits a downlink shared channel based on the fifth downlink control information, and the second transmission point transmits a downlink shared channel based on the sixth downlink control information.

Furthermore, the mode may be configured to the control section 210 by a higher layer signaling (e.g., an RRC information element or an MAC CE).

Furthermore, the transmitting/receiving section 220 may receive one or more pieces of downlink control information for scheduling the one or more downlink shared channels. At least ones of bit widths, interpretations and values of specific fields in the one or more pieces of downlink control information may differ according to the mode.

Furthermore, the mode may be configured to the control section 210 by one downlink control information transmitted from one transmission point.

(Hardware Configuration)

In addition, the block diagrams used to describe the above embodiments illustrate blocks in function units. These function blocks (components) are realized by an arbitrary combination of at least ones of hardware components and software components. Furthermore, a method for realizing each function block is not limited in particular. That is, each function block may be realized by using one physically or logically coupled apparatus or may be realized by connecting two or more physically or logically separate apparatuses directly or indirectly (by using, for example, wired connection or radio connection) and using a plurality of these apparatuses. Each function block may be realized by combining software with the above one apparatus or a plurality of above apparatuses.

In this regard, the functions include deciding, determining, judging, calculating, computing, processing, deriving, investigating, looking up, ascertaining, receiving, transmitting, outputting, accessing, resolving, selecting, choosing, establishing, comparing, assuming, expecting, considering, broadcasting, notifying, communicating, forwarding, configuring, reconfiguring, allocating, mapping, and assigning, yet are not limited to these. For example, a function block (component) that causes transmission to function may be referred to as, for example, a transmitting unit or a transmitter. As described above, the method for realizing each function block is not limited in particular.

Figure 7:
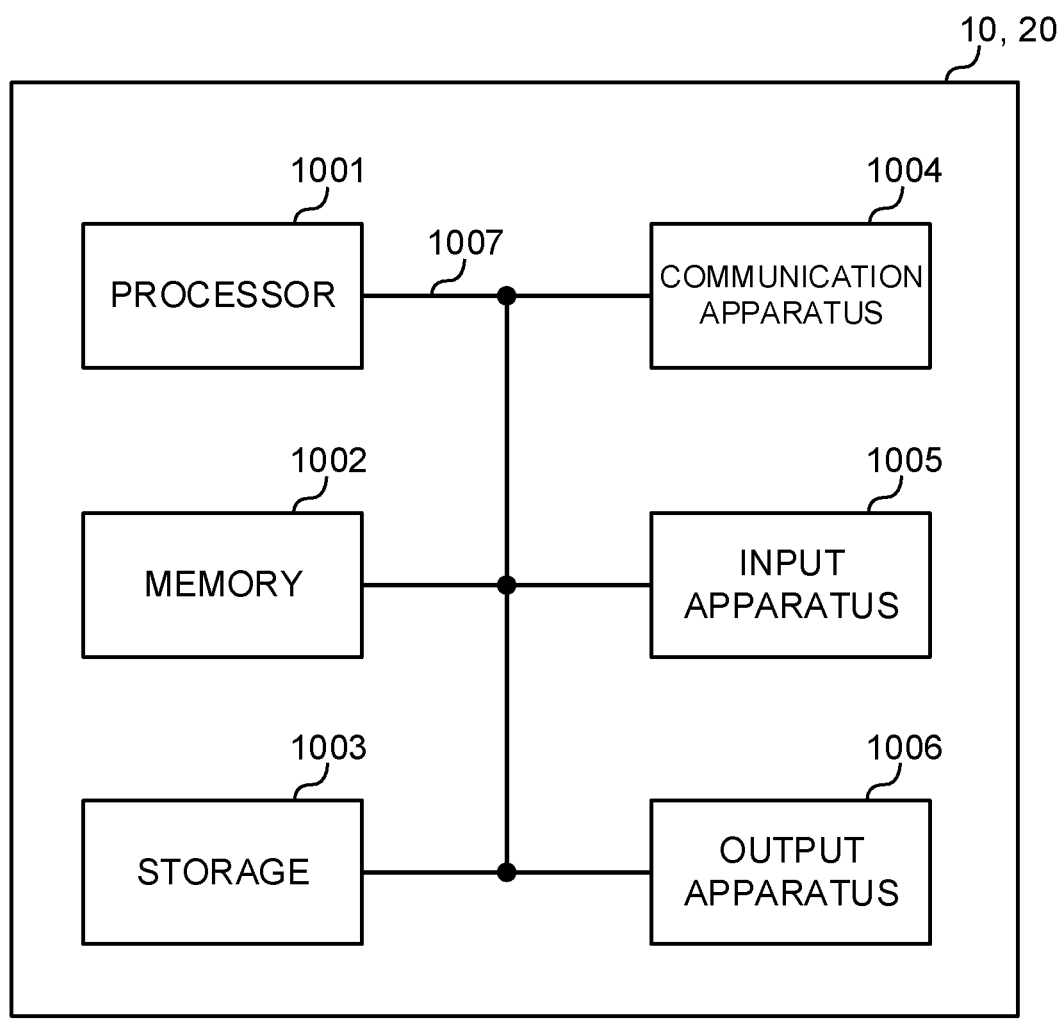
FIG. 7 is a diagram illustrating one example of hardware configurations of the base station and the user terminal according to the one embodiment.

For example, the base station and the user terminal according to the one embodiment of the present disclosure may function as computers that perform processing of the radio communication method according to the present disclosure. FIG. 7 is a diagram illustrating one example of the hardware configurations of the base station and the user terminal according to the one embodiment. The above-described base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, words such as an apparatus, a circuit, a device, a section and a unit in the present disclosure can be interchangeably read. The hardware configurations of the base station 10 and the user terminal 20 may be configured to include one or a plurality of apparatuses illustrated in FIG. 7 or may be configured without including part of the apparatuses.

For example, FIG. 7 illustrates the only one processor 1001. However, there may be a plurality of processors. Furthermore, processing may be executed by 1 processor or processing may be executed by 2 or more processors simultaneously or successively or by using another method. In addition, the processor 1001 may be implemented by one or more chips.

Each function of the base station 10 and the user terminal 20 is realized by, for example, causing hardware such as the processor 1001 and the memory 1002 to read given software (program), and thereby causing the processor 1001 to perform an operation, and control communication via the communication apparatus 1004 and control at least one of reading and writing of data in the memory 1002 and the storage 1003.

The processor 1001 causes, for example, an operating system to operate to control the entire computer. The processor 1001 may be composed of a Central Processing Unit (CPU) including an interface for a peripheral apparatus, a control apparatus, an operation apparatus and a register. For example, at least part of the above-described control section 110 (210) and transmitting/receiving section 120 (220) may be realized by the processor 1001.

Furthermore, the processor 1001 reads programs (program codes), software modules or data from at least one of the storage 1003 and the communication apparatus 1004 out to the memory 1002, and executes various types of processing according to these programs, software modules or data. As the programs, programs that cause the computer to execute at least part of the operations described in the above-described embodiments are used. For example, the control section 110 (210) may be realized by a control program that is stored in the memory 1002 and operates on the processor 1001, and other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as, for example, a register, a cache or a main memory (main storage apparatus). The memory 1002 can store programs (program codes) and software modules that can be executed to perform the radio communication method according to the one embodiment of the present disclosure.

The storage 1003 is a computer-readable recording medium, and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via at least one of a wired network and a radio network, and is also referred to as, for example, a network device, a network controller, a network card and a communication module. The communication apparatus 1004 may be configured to include a high frequency switch, a duplexer, a filter and a frequency synthesizer to realize at least one of, for example, Frequency Division Duplex (FDD) and Time Division Duplex (TDD). For example, the above-described transmitting/receiving section 120 (220) and transmission/reception antennas 130 (230) may be realized by the communication apparatus 1004. The transmitting/receiving section 120 (220) may be physically or logically separately implemented as a transmitting section 120a (220a) and a receiving section 120b (220b).

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may be an integrated component (e.g., touch panel).

Furthermore, each apparatus such as the processor 1001 or the memory 1002 is connected by the bus 1007 that communicates information. The bus 1007 may be composed by using a single bus or may be composed by using different buses between apparatuses.

Furthermore, the base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may be used to realize part or entirety of each function block. For example, the processor 1001 may be implemented by using at least one of these hardware components.

Modified Example

In addition, each term that has been described in the present disclosure and each term that is necessary to understand the present disclosure may be replaced with terms having identical or similar meanings. For example, a channel, a symbol and a signal (a signal or a signaling) may be interchangeably read. Furthermore, a signal may be a message. A reference signal can be also abbreviated as an RS, or may be referred to as a pilot or a pilot signal depending on standards to be applied. Furthermore, a Component Carrier (CC) may be referred to as, for example, a cell, a frequency carrier and a carrier frequency.

A radio frame may include one or a plurality of durations (frames) in a time domain. Each of one or a plurality of durations (frames) that makes up a radio frame may be referred to as a subframe. Furthermore, the subframe may include one or a plurality of slots in the time domain. The subframe may be a fixed time duration (e.g., 1 ms) that does not depend on a numerology.

In this regard, the numerology may be a communication parameter to be applied to at least one of transmission and reception of a certain signal or channel. The numerology may indicate at least one of, for example, a SubCarrier Spacing (SCS), a bandwidth, a symbol length, a cyclic prefix length, a Transmission Time Interval (TTI), the number of symbols per TTI, a radio frame configuration, specific filtering processing performed by a transceiver in a frequency domain, and specific windowing processing performed by the transceiver in a time domain.

The slot may include one or a plurality of symbols (Orthogonal Frequency Division Multiplexing (OFDM) symbols or Single Carrier Frequency Division Multiple Access (SC-FDMA) symbols) in the time domain. Furthermore, the slot may be a time unit based on the numerology.

The slot may include a plurality of mini slots. Each mini slot may include one or a plurality of symbols in the time domain. Furthermore, the mini slot may be referred to as a sub slot. The mini slot may include a smaller number of symbols than that of the slot. The PDSCH (or the PUSCH) to be transmitted in larger time units than that of the mini slot may be referred to as a PDSCH (PUSCH) mapping type A.

The PDSCH (or the PUSCH) to be transmitted by using the mini slot may be referred to as a PDSCH (PUSCH) mapping type B.

The radio frame, the subframe, the slot, the mini slot and the symbol each indicate a time unit for conveying signals. The other corresponding names may be used for the radio frame, the subframe, the slot, the mini slot and the symbol. In addition, time units such as a frame, a subframe, a slot, a mini slot and a symbol in the present disclosure may be interchangeably read.

For example, 1 subframe may be referred to as a TTI, a plurality of contiguous subframes may be referred to as TTIs, or 1 slot or 1 mini slot may be referred to as a TTI. That is, at least one of the subframe and the TTI may be a subframe (1 ms) according to legacy LTE, may be a duration (e.g., 1 to 13 symbols) shorter than 1 ms or may be a duration longer than 1 ms. In addition, a unit that indicates the TTI may be referred to as, for example, a slot or a mini slot instead of a subframe.

In this regard, the TTI refers to, for example, a minimum time unit of scheduling of radio communication. For example, in the LTE system, the base station performs scheduling for allocating radio resources (a frequency bandwidth or transmission power that can be used in each user terminal) in TTI units to each user terminal. In this regard, a definition of the TTI is not limited to this.

The TTI may be a transmission time unit of a channel-coded data packet (transport block), code block or codeword, or may be a processing unit of scheduling or link adaptation. In addition, when the TTI is given, a time period (e.g., the number of symbols) in which a transport block, a code block or a codeword is actually mapped may be shorter than the TTI.

In addition, when 1 slot or 1 mini slot is referred to as a TTI, one or more TTIs (i.e., one or more slots or one or more mini slots) may be a minimum time unit of scheduling. Furthermore, the number of slots (the number of mini slots) that make up a minimum time unit of the scheduling may be controlled.

The TTI having the time duration of 1 ms may be referred to as, for example, a general TTI (TTIs according to 3GPP Rel. 8 to 12), a normal TTI, a long TTI, a general subframe, a normal subframe, a long subframe or a slot. A TTI shorter than the general TTI may be referred to as, for example, a reduced TTI, a short TTI, a partial or fractional TTI, a reduced subframe, a short subframe, a mini slot, a subslot or a slot.

In addition, the long TTI (e.g., the general TTI or the subframe) may be read as a TTI having a time duration exceeding 1 ms, and the short TTI (e.g., the reduced TTI) may be read as a TTI having a TTI length less than the TTI length of the long TTI and equal to or more than 1 ms.

A Resource Block (RB) is a resource allocation unit of the time domain and the frequency domain, and may include one or a plurality of contiguous subcarriers in the frequency domain. The numbers of subcarriers included in RBs may be the same irrespectively of a numerology, and may be, for example, 12. The numbers of subcarriers included in the RBs may be determined based on the numerology.

Furthermore, the RB may include one or a plurality of symbols in the time domain or may have the length of 1 slot, 1 mini slot, 1 subframe or 1 TTI. 1 TTI or 1 subframe may each include one or a plurality of resource blocks.

In this regard, one or a plurality of RBs may be referred to as, for example, a Physical Resource Block (Physical RB (PRB)), a Sub-Carrier Group (SCG), a Resource Element Group (REG), a PRB pair or an RB pair.

Furthermore, the resource block may include one or a plurality of Resource Elements (REs). For example, 1 RE may be a radio resource domain of 1 subcarrier and 1 symbol.

A Bandwidth Part (BWP) (that may be referred to as, for example, a partial bandwidth) may mean a subset of contiguous common Resource Blocks (common RBs) for a certain numerology in a certain carrier. In this regard, the common RB may be specified by an RB index based on a common reference point of the certain carrier. A PRB may be defined based on a certain BWP, and may be numbered in the certain BWP.

The BWP may include a UL BWP (a BWP for UL) and a DL BWP (a BWP for DL). One or a plurality of BWPs in 1 carrier may be configured to the UE.

At least one of the configured BWPs may be active, and the UE may not assume to transmit and receive given signals/channels outside the active BWP. In addition, a "cell" and a "carrier" in the present disclosure may be read as a "BWP".

In this regard, structures of the above-described radio frame, subframe, slot, mini slot and symbol are only exemplary structures. For example, configurations such as the number of subframes included in a radio frame, the number of slots per subframe or radio frame, the number of mini slots included in a slot, the numbers of symbols and RBs included in a slot or a mini slot, the number of subcarriers included in an RB, the number of symbols in a TTI, a symbol length and a Cyclic Prefix (CP) length can be variously changed.

Furthermore, the information and the parameters described in the present disclosure may be expressed by using absolute values, may be expressed by using relative values with respect to given values or may be expressed by using other corresponding information. For example, a radio resource may be instructed by a given index.

Names used for parameters in the present disclosure are in no respect restrictive names. Furthermore, numerical expressions that use these parameters may be different from those explicitly disclosed in the present disclosure. Various channels (the PUCCH and the PDCCH) and information elements can be identified based on various suitable names. Therefore, various names assigned to these various channels and information elements are in no respect restrictive names.

The information and the signals described in the present disclosure may be expressed by using one of various different techniques. For example, the data, the instructions, the commands, the information, the signals, the bits, the symbols and the chips mentioned in the above entire description may be expressed as voltages, currents, electromagnetic waves, magnetic fields or magnetic particles, optical fields or photons, or arbitrary combinations of these.

Furthermore, the information and the signals can be output at least one of from a higher layer to a lower layer and from the lower layer to the higher layer. The information and the signals may be input and output via a plurality of network nodes.

The input and output information and signals may be stored in a specific location (e.g., memory) or may be managed by using a management table. The information and signals to be input and output can be overridden, updated or additionally written. The output information and signals may be deleted. The input information and signals may be transmitted to other apparatuses.

Notification of information is not limited to the aspect/embodiments described in the present disclosure and may be performed by using other methods. For example, the information may be notified in the present disclosure by a physical layer signaling (e.g., Downlink Control Information (DCI) and Uplink Control Information (UCI)), a higher layer signaling (e.g., a Radio Resource Control (RRC) signaling, broadcast information (such as a Master Information Block (MIB) and a System Information Block (SIB)), and a Medium Access Control (MAC) signaling), other signals or combinations of these.

In addition, the physical layer signaling may be referred to as Layer 1/Layer 2 (L1/L2) control information (L1/L2 control signal) or L1 control information (L1 control signal). Furthermore, the RRC signaling may be referred to as an RRC message, and may be, for example, an RRCConnectionSetup message or an RRCConnectionReconfiguration message. Furthermore, the MAC signaling may be notified by using, for example, an MAC Control Element (MAC CE).

Furthermore, notification of given information (e.g., notification of "being X") is not limited to explicit notification, and may be given implicitly (by, for example, not giving notification of the given information or by giving notification of another information).

Judgement may be made based on a value (0 or 1) expressed as 1 bit, may be made based on a boolean expressed as true or false or may be made by comparing numerical values (by, for example, making comparison with a given value).

Irrespectively of whether software is referred to as software, firmware, middleware, a microcode or a hardware description language or is referred to as other names, the software should be widely interpreted to mean a command, a command set, a code, a code segment, a program code, a program, a subprogram, a software module, an application, a software application, a software package, a routine, a subroutine, an object, an executable file, an execution thread, a procedure or a function.

Furthermore, software, commands and information may be transmitted and received via transmission media. When, for example, the software is transmitted from websites, servers or other remote sources by using at least ones of wired techniques (e.g., coaxial cables, optical fiber cables, twisted pairs and Digital Subscriber Lines (DSLs)) and radio techniques (e.g., infrared rays and microwaves), at least ones of these wired techniques and radio techniques are included in a definition of the transmission media.

The terms "system" and "network" used in the present disclosure can be interchangeably used. The "network" may mean an apparatus (e.g., base station) included in the network.

In the present disclosure, terms such as "precoding", a "precoder", a "weight (precoding weight)", "Quasi-Co-Location (QCL)", a "Transmission Configuration Indication state (TCI state)", a "spatial relation", a "spatial domain filter", "transmission power", "phase rotation", an "antenna port", an "antenna port group", a "layer", "the number of layers", a "rank", a "resource", a "resource set", a "resource group", a "beam", a "beam width", a "beam angle", an "antenna", an "antenna element" and a "panel" can be interchangeably used.

In the present disclosure, terms such as a "Base Station (BS)", a "radio base station", a "fixed station", a "NodeB", an "eNodeB (eNB)", a "gNodeB (gNB)", an "access point", a "Transmission Point (TP)", a "Reception Point (RP)", a "Transmission/Reception Point (TRP)", a "panel", a "cell", a "sector", a "cell group", a "carrier" and a "component carrier" can be interchangeably used. The base station is also referred to as terms such as a macro cell, a small cell, a femtocell or a picocell.

The base station can accommodate one or a plurality of (e.g., three) cells. When the base station accommodates a plurality of cells, an entire coverage area of the base station can be partitioned into a plurality of smaller areas. Each smaller area can also provide a communication service via a base station subsystem (e.g., indoor small base station (RRH: Remote Radio Head)). The term "cell" or "sector" indicates part or the entirety of the coverage area of at least one of the base station and the base station subsystem that provide a communication service in this coverage.

In the present disclosure, the terms such as "Mobile Station (MS)", "user terminal", "user apparatus (UE: User Equipment)" and "terminal" can be interchangeably used.

The mobile station is also referred to as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

At least one of the base station and the mobile station may be referred to as, for example, a transmission apparatus, a reception apparatus or a radio communication apparatus. In addition, at least one of the base station and the mobile station may be, for example, a device mounted on a movable body or the movable body itself. The movable body may be a vehicle (e.g., a car or an airplane), may be a movable body (e.g., a drone or a self-driving car) that moves unmanned or may be a robot (a manned type or an unmanned type). In addition, at least one of the base station and the mobile station includes an apparatus, too, that does not necessarily move during a communication operation. For example, at least one of the base station and the mobile station may be an Internet of Things (IoT) device such as a sensor.

Furthermore, the base station in the present disclosure may be read as the user terminal. For example, each aspect/embodiment of the present disclosure may be applied to a configuration where communication between the base station and the user terminal is replaced with communication between a plurality of user terminals (that may be referred to as, for example, Device-to-Device (D2D) or Vehicle-to-Everything (V2X)). In this case, the user terminal 20 may be configured to include the functions of the above-described base station 10. Furthermore, words such as "uplink" and "downlink" may be read as a word (e.g., a "side") that matches terminal-to-terminal communication. For example, the uplink channel and the downlink channel may be read as side channels.

Similarly, the user terminal in the present disclosure may be read as the base station. In this case, the base station 10 may be configured to include the functions of the above-described user terminal 20.

In the present disclosure, operations performed by the base station are performed by an upper node of this base station depending on cases. Obviously, in a network including one or a plurality of network nodes including the base stations, various operations performed to communicate with a terminal can be performed by base stations, one or more network nodes (that are regarded as, for example, Mobility Management Entities (MMES) or Serving-Gateways (S-GWs), yet are not limited to these) other than the base stations or a combination of these.

Each aspect/embodiment described in the present disclosure may be used alone, may be used in combination or may be switched and used when carried out. Furthermore, orders of the processing procedures, the sequences and the flowchart according to each aspect/embodiment described in the present disclosure may be rearranged unless contradictions arise. For example, the method described in the present disclosure presents various step elements by using an exemplary order and is not limited to the presented specific order.

Each aspect/embodiment described in the present disclosure may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), the New-Radio Access Technology (RAT), New Radio (NR), New radio access (NX), Future generation radio access (FX), the Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods, or next-generation systems that are enhanced based on these systems. Furthermore, a plurality of systems may be combined (for example, LTE or LTE-A and 5G may be combined) and applied.

The phrase "based on" used in the present disclosure does not mean "based only on" unless specified otherwise. In other words, the phrase "based on" means both of "based only on" and "based at least on".

Every reference to elements that use names such as "first" and "second" used in the present disclosure does not generally limit the quantity or the order of these elements. These names can be used in the present disclosure as a convenient method for distinguishing between two or more elements. Hence, the reference to the first and second elements does not mean that only two elements can be employed or the first element should precede the second element in some way.

The term "deciding (determining)" used in the present disclosure includes diverse operations in some cases. For example, "deciding (determining)" may be considered to "decide (determine)" judging, calculating, computing, processing, deriving, investigating, looking up, search and inquiry (e.g., looking up in a table, a database or another data structure), and ascertaining.

Furthermore, "deciding (determining)" may be considered to "decide (determine)" receiving (e.g., receiving information), transmitting (e.g., transmitting information), input, output and accessing (e.g., accessing data in a memory).

Furthermore, "deciding (determining)" may be considered to "decide (determine)" resolving, selecting, choosing, establishing and comparing. That is, "deciding (determining)" may be considered to "decide (determine)" some operation.

Furthermore, "deciding (determining)" may be read as "assuming", "expecting" and "considering".

"Maximum transmit power" disclosed in the present disclosure may mean a maximum value of transmit power, may mean the nominal UE maximum transmit power, or may mean the rated UE maximum transmit power.

The words "connected" and "coupled" used in the present disclosure or every modification of these words can mean every direct or indirect connection or coupling between 2 or more elements, and can include that one or more intermediate elements exist between the two elements "connected" or "coupled" with each other. The elements may be coupled or connected physically or logically or by a combination of these physical and logical connections. For example, "connection" may be read as "access".

It can be understood in the present disclosure that, when connected, the two elements are "connected" or "coupled" with each other by using one or more electric wires, cables or printed electrical connection, and by using electromagnetic energy having wavelengths in radio frequency domains, microwave domains or (both of visible and invisible) light domains in some non-restrictive and non-comprehensive examples.

A sentence that "A and B are different" in the present disclosure may mean that "A and B are different from each other". In this regard, the sentence may mean that "A and B are each different from C". Words such as "separate" and "coupled" may be also interpreted in a similar way to "different".

When the words "include" and "including" and modifications of these words are used in the present disclosure, these words intend to be comprehensive similar to the word "comprising". Furthermore, the word "or" used in the present disclosure intends to not be an exclusive OR.

When, for example, translation adds articles such as a, an and the in English in the present disclosure, the present disclosure may include that nouns coming after these articles are plural.

The invention according to the present disclosure has been described in detail above. However, it is obvious for a person skilled in the art that the invention according to the present disclosure is not limited to the embodiments described in the present disclosure. The invention according to the present disclosure can be carried out as modified and changed aspects without departing from the gist and the scope of the invention defined based on the recitation of the claims. Accordingly, the description of the present disclosure is intended for exemplary explanation, and does not bring any restrictive meaning to the invention according to the present disclosure.

The invention claimed is:

1. A terminal comprising:
a processor that determines whether to apply:
a first mode using a plurality of transmission and reception points (TRPs) based on single-downlink control information (DCI), in response to an activation by a medium access control (MAC) control element and an indication by a specific field included in the DCI and
a second mode using the plurality of TRPs based on multi-DCI, in response to a configuration by radio resource control (RRC) signaling; and
a receiver that receives at least one physical downlink shared channel (PDSCH) according to the one of the first mode and the second mode,
wherein the terminal receives one DCI from one of the plurality of TRPs in case of the first mode, and the terminal receives different DCIs from each of the plurality of TRPs in case of the second mode, and
wherein a transmission configuration indication (TCI) field in a DCI received in the first mode and a TCI field in a DCI received in the second mode are 0 bit or 3 bits.

2. The terminal according to claim 1, wherein the processor determines, based on a common RRC parameter, a number of bits of a TCI field included in first DCI and a number of bits of a TCI field included in second DCI, in the second mode.

3. The terminal according to claim 1, wherein a carrier indicator field in a DCI received in the first mode and a carrier indicator field in a DCI received in the second mode are 0 bit or 3 bits.

4. A radio communication method for a terminal, comprising:
   determining whether to apply:
      a first mode using a plurality of transmission and reception points (TRPs) based on single-downlink control information (DCI), in response to an activation by a medium access control (MAC) control element and an indication by a specific field included in the DCI and
      a second mode using the plurality of TRPs based on multi-DCI, in response to a configuration by radio resource control (RRC) signaling; and
   receiving at least one physical downlink shared channel (PDSCH) according to the one of the first mode and the second mode,
   wherein the terminal receives one DCI from one of the plurality of TRPs in case of the first mode, and the terminal receives different DCIs from each of the plurality of TRPs in case of the second mode, and
   wherein a transmission configuration indication (TCI) field in a DCI received in the first mode and a TCI field in a DCI received in the second mode are 0 bit or 3 bits.

5. A base station comprising:
   a processor that indicates to apply:
      a first mode using a plurality of transmission and reception points (TRPs) based on single-downlink control information (DCI), in response to an activation by medium access control (MAC) control element and an indication by a specific field included in the DCI and
      a second mode using the plurality of TRPs based on multi-DCI, in response to a configuration by radio resource control (RRC) signaling; and
   a transmitter that transmits, by using one of the first mode and the second mode, at least one physical downlink shared channel (PDSCH),
   wherein a terminal receives one DCI from one of the plurality of TRPs in case of the first mode, and the terminal receives different DCIs from each of the plurality of TRPs in case of the second mode, and
   wherein a transmission configuration indication (TCI) field in a DCI received by the terminal in the first mode and a TCI field in a DCI received by the terminal in the second mode are 0 bit or 3 bits.

6. A system comprising a base station and a terminal, wherein
   the base station comprises:
      a first processor that indicates to apply:
         a first mode using a plurality of transmission and reception points (TRPs) based on single-downlink control information (DCI), in response to an activation by a medium access control (MAC) control element and an indication by a specific field included in the DCI and
         a second mode using the plurality of TRPs based on multi-DCI, in response to a configuration by radio resource control (RRC) signaling, and
   the terminal comprises:
      a second processor that determines whether to apply the first mode and the second mode; and
      a receiver that receives at least one physical downlink shared channel (PDSCH) according to one of the first mode and the second mode,
   wherein the terminal receives one DCI from one of the a plurality of TRPs in case of the first mode, and the terminal receives different DCIs from each of the plurality of TRPs in case of the second mode, and
   wherein a transmission configuration indication (TCI) field in a DCI received in the first mode and a TCI field in a DCI received in the second mode are 0 bit or 3 bits.

\* \* \* \* \*